US009436804B2

(12) United States Patent
Marsh

(10) Patent No.: US 9,436,804 B2
(45) Date of Patent: Sep. 6, 2016

(54) ESTABLISHING A UNIQUE SESSION KEY USING A HARDWARE FUNCTIONALITY SCAN

(75) Inventor: David J. Marsh, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1723 days.

(21) Appl. No.: 11/227,045

(22) Filed: Sep. 15, 2005

(65) Prior Publication Data

US 2007/0058807 A1    Mar. 15, 2007

Related U.S. Application Data

(60) Provisional application No. 60/673,979, filed on Apr. 22, 2005.

(51) Int. Cl.
| | |
|---|---|
| *H04L 9/00* | (2006.01) |
| *G06F 21/10* | (2013.01) |
| *G06F 21/31* | (2013.01) |
| *G06F 21/60* | (2013.01) |
| *H04L 9/08* | (2006.01) |

(52) U.S. Cl.
CPC .............. *G06F 21/10* (2013.01); *G06F 21/31* (2013.01); *G06F 21/602* (2013.01); *G06F 21/606* (2013.01); *H04L 9/0866* (2013.01); *G06F 2221/2129* (2013.01); *H04L 2209/60* (2013.01)

(58) Field of Classification Search
CPC ..................... G06F 21/606; G06F 2221/2129; H04L 2209/60
USPC ................................ 380/44; 713/171; 726/34
See application file for complete search history.

(56) References Cited

U.S. PATENT DOCUMENTS

| | | | |
|---|---|---|---|
| 4,183,085 A | 1/1980 | Roberts et al. |
| 4,405,829 A | 9/1983 | Rivest et al. |
| 4,529,870 A | 7/1985 | Chaum |
| 4,558,176 A | 12/1985 | Arnold et al. |
| 4,620,150 A | 10/1986 | Germer et al. |
| 4,750,034 A | 6/1988 | Lem |
| 4,817,094 A | 3/1989 | Lebizay et al. |
| 4,855,730 A | 8/1989 | Venners et al. |
| 4,855,922 A | 8/1989 | Huddleston et al. |
| 4,857,999 A | 8/1989 | Welsh |
| 4,910,692 A | 3/1990 | Outram |

(Continued)

FOREIGN PATENT DOCUMENTS

| | | |
|---|---|---|
| CN | 1287665 | 3/2001 |
| CN | 1305159 | 7/2001 |

(Continued)

OTHER PUBLICATIONS

Pearson, Siani et al. "Trusted Computing Platforms: TCPA Technology in Context" © 2002 Prentice Hall Inc. (347 pages).*

(Continued)

*Primary Examiner* — Joseph P Hirl
*Assistant Examiner* — Thomas Gyorfi
(74) *Attorney, Agent, or Firm* — Sunah Lee; Judy Yee; Micky Minhas

(57) ABSTRACT

Systems and methods for independently generating a unique private session key at one or more hardware devices within a computing system using a subset of the functionality implemented in a hardware functionality scan combined with the use of a one-way mathematical function.

20 Claims, 7 Drawing Sheets

(56) References Cited

U.S. PATENT DOCUMENTS

| | | |
|---|---|---|
| 4,916,738 A | 4/1990 | Chandra et al. |
| 4,926,479 A | 5/1990 | Goldwasser |
| 4,959,774 A | 9/1990 | Davis |
| 4,967,273 A | 10/1990 | Greenberg |
| 5,001,752 A | 3/1991 | Fischer |
| 5,012,514 A | 4/1991 | Renton |
| 5,047,928 A | 9/1991 | Wiedemer |
| 5,050,213 A | 9/1991 | Shear |
| 5,204,897 A | 4/1993 | Wyman |
| 5,249,184 A | 9/1993 | Woest et al. |
| 5,261,002 A | 11/1993 | Perlman |
| 5,269,019 A | 12/1993 | Peterson et al. |
| 5,274,368 A | 12/1993 | Breeden et al. |
| 5,295,266 A | 3/1994 | Hinsley |
| 5,301,268 A | 4/1994 | Takeda |
| 5,303,370 A | 4/1994 | Brosh et al. |
| 5,355,161 A | 10/1994 | Bird et al. |
| 5,369,262 A | 11/1994 | Dvorkis et al. |
| 5,373,561 A | 12/1994 | Haber |
| 5,406,630 A | 4/1995 | Piosenka et al. |
| 5,414,861 A | 5/1995 | Horning |
| 5,437,040 A | 7/1995 | Campbell |
| 5,442,704 A | 8/1995 | Holtey |
| 5,444,780 A | 8/1995 | Hartman |
| 5,448,045 A | 9/1995 | Clark |
| 5,457,699 A * | 10/1995 | Bode et al. .................. 714/727 |
| 5,459,867 A | 10/1995 | Adams et al. |
| 5,469,506 A | 11/1995 | Berson |
| 5,473,692 A | 12/1995 | Davis |
| 5,490,216 A | 2/1996 | Richardson, III |
| 5,500,897 A | 3/1996 | Hartman, Jr. |
| 5,509,070 A | 4/1996 | Schull |
| 5,513,319 A | 4/1996 | Finch et al. |
| 5,522,040 A | 5/1996 | Hofsass et al. |
| 5,530,846 A | 6/1996 | Strong |
| 5,535,276 A | 7/1996 | Ganesan |
| 5,552,776 A | 9/1996 | Wade et al. |
| 5,553,143 A | 9/1996 | Ross |
| 5,557,765 A | 9/1996 | Lipner |
| 5,563,799 A | 10/1996 | Brehmer et al. |
| 5,568,552 A | 10/1996 | Davis |
| 5,574,611 A | 11/1996 | Nishijima et al. |
| 5,586,291 A | 12/1996 | Lasker et al. |
| 5,615,268 A | 3/1997 | Bisbee |
| 5,636,292 A | 6/1997 | Rhoads |
| 5,638,513 A | 6/1997 | Ananda |
| 5,644,364 A | 7/1997 | Kurtze |
| 5,671,412 A | 9/1997 | Christiano |
| 5,708,709 A | 1/1998 | Rose |
| 5,710,706 A | 1/1998 | Markl et al. |
| 5,715,403 A | 2/1998 | Stefik |
| 5,717,926 A | 2/1998 | Browning |
| 5,721,788 A | 2/1998 | Powell et al. |
| 5,724,425 A | 3/1998 | Chang et al. |
| 5,745,573 A | 4/1998 | Lipner |
| 5,745,879 A | 4/1998 | Wyman |
| 5,754,657 A | 5/1998 | Schipper |
| 5,754,763 A | 5/1998 | Bereiter |
| 5,757,908 A | 5/1998 | Cooper |
| 5,758,068 A | 5/1998 | Brandt et al. |
| 5,763,832 A | 6/1998 | Anselm |
| 5,768,382 A | 6/1998 | Schneier et al. |
| 5,771,354 A | 6/1998 | Crawford |
| 5,774,870 A | 6/1998 | Storey |
| 5,790,664 A | 8/1998 | Coley |
| 5,793,839 A | 8/1998 | Farris et al. |
| 5,799,088 A | 8/1998 | Raike |
| 5,802,592 A | 9/1998 | Chess |
| 5,812,930 A | 9/1998 | Zavrel |
| 5,825,876 A | 10/1998 | Peterson |
| 5,825,877 A | 10/1998 | Dan et al. |
| 5,825,883 A | 10/1998 | Archibald et al. |
| 5,841,865 A | 11/1998 | Sudia |
| 5,844,986 A | 12/1998 | Davis |
| 5,845,065 A | 12/1998 | Conte et al. |
| 5,848,413 A | 12/1998 | Wolff |
| 5,864,620 A | 1/1999 | Pettitt |
| 5,872,846 A | 2/1999 | Ichikawa |
| 5,875,236 A | 2/1999 | Jankowitz et al. |
| 5,883,670 A | 3/1999 | Sporer et al. |
| 5,883,958 A | 3/1999 | Ishiguro |
| 5,884,280 A | 3/1999 | Yoshioka et al. |
| 5,892,906 A | 4/1999 | Chou et al. |
| 5,893,086 A | 4/1999 | Schmuck |
| 5,893,920 A | 4/1999 | Shaheen |
| 5,905,799 A | 5/1999 | Ganesan |
| 5,913,038 A | 6/1999 | Griffiths |
| 5,917,912 A | 6/1999 | Ginter |
| 5,925,127 A | 7/1999 | Ahmad |
| 5,943,248 A | 8/1999 | Clapp |
| 5,943,422 A | 8/1999 | Van Wie |
| 5,948,061 A | 9/1999 | Merriman et al. |
| 5,949,877 A | 9/1999 | Traw |
| 5,951,642 A | 9/1999 | Onoe |
| 5,953,502 A | 9/1999 | Helbig et al. |
| 5,956,408 A | 9/1999 | Arnold |
| 5,982,891 A | 11/1999 | Ginter |
| 5,983,238 A | 11/1999 | Becker et al. |
| 5,987,126 A | 11/1999 | Okuyama |
| 5,991,406 A | 11/1999 | Lipner |
| 5,994,710 A | 11/1999 | Knee et al. |
| 5,995,625 A | 11/1999 | Sudia |
| 6,005,945 A | 12/1999 | Whitehouse |
| 6,009,177 A | 12/1999 | Sudia |
| 6,021,438 A | 2/2000 | Duvvoori |
| 6,023,510 A | 2/2000 | Epstein |
| 6,026,293 A | 2/2000 | Osborn |
| 6,049,789 A | 4/2000 | Frison et al. |
| 6,049,878 A | 4/2000 | Caronni |
| 6,052,735 A | 4/2000 | Ulrich |
| 6,058,188 A | 5/2000 | Chandersekaran |
| 6,058,476 A | 5/2000 | Matsuzaki et al. |
| 6,061,794 A | 5/2000 | Angelo et al. |
| 6,072,874 A | 6/2000 | Shin |
| 6,073,124 A | 6/2000 | Krishnan |
| 6,078,909 A | 6/2000 | Knutson |
| 6,085,976 A | 7/2000 | Sehr |
| 6,101,606 A | 8/2000 | Diersch et al. |
| 6,105,069 A | 8/2000 | Franklin |
| 6,112,181 A | 8/2000 | Shear |
| 6,119,229 A | 9/2000 | Martinez et al. |
| 6,122,741 A | 9/2000 | Patterson |
| 6,128,740 A | 10/2000 | Curry |
| 6,131,162 A | 10/2000 | Yoshiura |
| 6,134,659 A | 10/2000 | Sprong |
| 6,141,754 A | 10/2000 | Choy |
| 6,147,773 A | 11/2000 | Taylor |
| 6,148,417 A | 11/2000 | Da Silva |
| 6,151,676 A | 11/2000 | Cuccia |
| 6,157,721 A | 12/2000 | Sibert et al. |
| 6,158,657 A | 12/2000 | Hall, III et al. |
| 6,163,512 A | 12/2000 | Jeun |
| 6,175,825 B1 | 1/2001 | Fruechtel |
| 6,178,244 B1 | 1/2001 | Takeda |
| 6,185,678 B1 | 2/2001 | Arbaugh et al. |
| 6,188,995 B1 | 2/2001 | Garst et al. |
| 6,189,146 B1 | 2/2001 | Misra |
| 6,192,392 B1 | 2/2001 | Ginter |
| 6,199,068 B1 | 3/2001 | Carpenter |
| 6,209,099 B1 | 3/2001 | Saunders |
| 6,212,634 B1 | 4/2001 | Geer |
| 6,219,652 B1 | 4/2001 | Carter |
| 6,219,788 B1 | 4/2001 | Flavin |
| 6,223,291 B1 | 4/2001 | Puhl |
| 6,226,618 B1 | 5/2001 | Downs |
| 6,226,747 B1 | 5/2001 | Larsson et al. |
| 6,230,185 B1 | 5/2001 | Salas et al. |
| 6,233,600 B1 | 5/2001 | Salas et al. |
| 6,233,685 B1 | 5/2001 | Smith |
| 6,243,439 B1 | 6/2001 | Arai et al. |
| 6,243,470 B1 | 6/2001 | Coppersmith |
| 6,243,692 B1 | 6/2001 | Floyd |
| 6,253,224 B1 | 6/2001 | Brice, Jr. et al. |
| 6,260,141 B1 | 7/2001 | Park |

(56) References Cited

U.S. PATENT DOCUMENTS

| | | |
|---|---|---|
| 6,263,313 B1 | 7/2001 | Milsted |
| 6,263,431 B1 | 7/2001 | Lovelace et al. |
| 6,266,480 B1 | 7/2001 | Ezaki |
| 6,272,469 B1 | 8/2001 | Koritzinsky et al. |
| 6,279,111 B1 | 8/2001 | Jensenworth et al. |
| 6,279,156 B1 | 8/2001 | Amberg et al. |
| 6,286,051 B1 | 9/2001 | Becker et al. |
| 6,289,319 B1 | 9/2001 | Lockwood et al. |
| 6,289,452 B1 | 9/2001 | Arnold |
| 6,295,577 B1 | 9/2001 | Anderson et al. |
| 6,298,446 B1 | 10/2001 | Schreiber et al. |
| 6,303,924 B1 | 10/2001 | Adan et al. |
| 6,304,915 B1 | 10/2001 | Nguyen |
| 6,314,408 B1 | 11/2001 | Salas et al. |
| 6,314,409 B2 | 11/2001 | Schneck et al. |
| 6,321,335 B1 | 11/2001 | Chu |
| 6,324,544 B1 | 11/2001 | Alam |
| 6,327,652 B1 | 12/2001 | England et al. |
| 6,330,670 B1 | 12/2001 | England et al. |
| 6,334,189 B1 | 12/2001 | Granger et al. |
| 6,335,972 B1 | 1/2002 | Chandersekaran |
| 6,343,280 B2 | 1/2002 | Clark |
| 6,345,256 B1 | 2/2002 | Milsted |
| 6,345,294 B1 | 2/2002 | O'Toole et al. |
| 6,363,488 B1 | 3/2002 | Ginter |
| 6,367,017 B1 | 4/2002 | Gray |
| 6,373,047 B1 | 4/2002 | Adan et al. |
| 6,374,357 B1 | 4/2002 | Mohammed |
| 6,385,596 B1 | 5/2002 | Wiser |
| 6,385,727 B1 | 5/2002 | Cassagnol et al. |
| 6,389,535 B1 | 5/2002 | Thomlinson |
| 6,389,537 B1 | 5/2002 | Davis |
| 6,389,538 B1 | 5/2002 | Gruse |
| 6,389,541 B1 | 5/2002 | Patterson |
| 6,393,427 B1 | 5/2002 | Vu |
| 6,393,434 B1 | 5/2002 | Huang |
| 6,397,259 B1 | 5/2002 | Lincke |
| 6,398,245 B1 | 6/2002 | Gruse |
| 6,405,923 B1 | 6/2002 | Seysen |
| 6,407,680 B1 | 6/2002 | Lai |
| 6,408,170 B1 | 6/2002 | Schmidt et al. |
| 6,409,089 B1 | 6/2002 | Eskicioglu |
| 6,411,941 B1 | 6/2002 | Mullor et al. |
| 6,418,421 B1 | 7/2002 | Hurtado |
| 6,424,714 B1 | 7/2002 | Wasilewski et al. |
| 6,438,690 B1 | 8/2002 | Patel |
| 6,441,813 B1 | 8/2002 | Ishibashi |
| 6,442,529 B1 | 8/2002 | Krishan et al. |
| 6,442,690 B1 | 8/2002 | Howard |
| 6,446,207 B1 | 9/2002 | Vanstone |
| 6,449,598 B1 | 9/2002 | Green |
| 6,449,719 B1 | 9/2002 | Baker |
| 6,460,140 B1 | 10/2002 | Schoch et al. |
| 6,463,445 B1 | 10/2002 | Suzuki |
| 6,463,534 B1 | 10/2002 | Geiger et al. |
| 6,490,680 B1 | 12/2002 | Scheidt |
| 6,493,758 B1 | 12/2002 | McLain |
| 6,496,858 B1 | 12/2002 | Frailong et al. |
| 6,502,079 B1 | 12/2002 | Ball |
| 6,515,676 B1 | 2/2003 | Kasai |
| 6,532,451 B1 | 3/2003 | Schell |
| 6,539,364 B2 | 3/2003 | Moribatake |
| 6,542,546 B1 | 4/2003 | Vetro |
| 6,549,626 B1 | 4/2003 | Al-Salqan |
| 6,550,011 B1 | 4/2003 | Sims |
| 6,557,105 B1 | 4/2003 | Tardo |
| 6,567,793 B1 | 5/2003 | Hicks et al. |
| 6,571,216 B1 | 5/2003 | Garg et al. |
| 6,574,609 B1 | 6/2003 | Downs |
| 6,574,612 B1 | 6/2003 | Baratti |
| 6,581,102 B1 | 6/2003 | Amini |
| 6,581,331 B1 | 6/2003 | Kral |
| 6,585,158 B2 | 7/2003 | Norskog |
| 6,587,684 B1 | 7/2003 | Hsu et al. |
| 6,587,837 B1 | 7/2003 | Spagna |
| 6,609,201 B1 | 8/2003 | Folmsbee |
| 6,611,358 B1 | 8/2003 | Narayanaswamy |
| 6,615,350 B1 | 9/2003 | Schell |
| 6,625,729 B1 | 9/2003 | Angelo |
| 6,631,478 B1 | 10/2003 | Wang et al. |
| 6,646,244 B2 | 11/2003 | Aas et al. |
| 6,664,948 B2 | 12/2003 | Crane et al. |
| 6,665,303 B1 | 12/2003 | Saito |
| 6,671,737 B1 | 12/2003 | Snowdon |
| 6,671,803 B1 | 12/2003 | Pasieka |
| 6,678,828 B1 | 1/2004 | Pham et al. |
| 6,684,198 B1 | 1/2004 | Shimizu |
| 6,690,556 B2 | 2/2004 | Smola et al. |
| 6,694,000 B2 | 2/2004 | Ung et al. |
| 6,701,433 B1 | 3/2004 | Schell |
| 6,704,873 B1 | 3/2004 | Underwood |
| 6,708,176 B2 | 3/2004 | Strunk et al. |
| 6,711,263 B1 | 3/2004 | Nordenstam et al. |
| 6,714,921 B2 | 3/2004 | Stefik |
| 6,716,652 B1 | 4/2004 | Ortlieb et al. |
| 6,738,810 B1 | 5/2004 | Kramer et al. |
| 6,757,517 B2 | 6/2004 | Chang |
| 6,763,458 B1 | 7/2004 | Watanabe |
| 6,765,470 B2 | 7/2004 | Shinzaki |
| 6,775,655 B1 | 8/2004 | Peinado |
| 6,781,956 B1 | 8/2004 | Cheung |
| 6,791,157 B1 | 9/2004 | Casto et al. |
| 6,792,531 B2 | 9/2004 | Heiden |
| 6,816,809 B2 | 11/2004 | Circenis |
| 6,816,900 B1 | 11/2004 | Vogel et al. |
| 6,826,606 B2 | 11/2004 | Freeman |
| 6,826,690 B1 | 11/2004 | Hind |
| 6,834,352 B2 | 12/2004 | Shin |
| 6,839,841 B1 | 1/2005 | Medvinsky et al. |
| 6,844,871 B1 | 1/2005 | Hinckley et al. |
| 6,847,942 B1 | 1/2005 | Land et al. |
| 6,850,252 B1 | 2/2005 | Hoffberg |
| 6,851,051 B1 | 2/2005 | Bolle et al. |
| 6,853,380 B2 | 2/2005 | Alcorn |
| 6,859,790 B1 | 2/2005 | Nonaka |
| 6,868,433 B1 | 3/2005 | Philyaw |
| 6,871,283 B1 | 3/2005 | Zurko et al. |
| 6,895,504 B1 | 5/2005 | Zhang et al. |
| 6,898,286 B2 | 5/2005 | Murray |
| 6,920,567 B1 | 7/2005 | Doherty et al. |
| 6,922,724 B1 | 7/2005 | Freeman |
| 6,931,545 B1 * | 8/2005 | Ta et al. .................. 726/10 |
| 6,934,840 B2 | 8/2005 | Rich |
| 6,934,942 B1 | 8/2005 | Chilimbi |
| 6,954,728 B1 | 10/2005 | Kusumoto et al. |
| 6,957,186 B1 | 10/2005 | Guheen et al. |
| 6,959,288 B1 | 10/2005 | Medina |
| 6,959,290 B2 | 10/2005 | Stefik |
| 6,959,291 B1 | 10/2005 | Armstrong |
| 6,959,348 B1 | 10/2005 | Chan |
| 6,961,858 B2 | 11/2005 | Fransdonk |
| 6,973,444 B1 | 12/2005 | Blinn |
| 6,976,162 B1 | 12/2005 | Ellison et al. |
| 6,976,163 B1 | 12/2005 | Hind |
| 6,981,045 B1 | 12/2005 | Brooks |
| 6,983,050 B1 | 1/2006 | Yacobi et al. |
| 6,983,371 B1 | 1/2006 | Hurtado |
| 6,986,042 B2 | 1/2006 | Griffin |
| 6,990,174 B2 | 1/2006 | Eskelinen |
| 6,993,648 B2 | 1/2006 | Goodman et al. |
| 7,000,100 B2 | 2/2006 | Lacombe et al. |
| 7,000,829 B1 | 2/2006 | Harris et al. |
| 7,010,808 B1 | 3/2006 | Leung |
| 7,013,384 B2 | 3/2006 | Challener et al. |
| 7,017,188 B1 | 3/2006 | Schmeidler |
| 7,020,704 B1 | 3/2006 | Lipscomb |
| 7,024,393 B1 | 4/2006 | Peinado |
| 7,028,149 B2 | 4/2006 | Grawrock et al. |
| 7,028,180 B1 | 4/2006 | Aull |
| 7,039,643 B2 | 5/2006 | Sena |
| 7,039,801 B2 | 5/2006 | Narin |
| 7,043,633 B1 | 5/2006 | Fink et al. |
| 7,051,005 B1 | 5/2006 | Peinado |
| 7,052,530 B2 | 5/2006 | Edlund et al. |

(56) References Cited

U.S. PATENT DOCUMENTS

| | | | |
|---|---|---|---|
| 7,054,335 B2 | 5/2006 | Wee | |
| 7,054,468 B2 | 5/2006 | Yang | |
| 7,054,964 B2 | 5/2006 | Chan | |
| 7,055,169 B2 | 5/2006 | Delpuch | |
| 7,058,819 B2 | 6/2006 | Okaue | |
| 7,069,442 B2 | 6/2006 | Sutton, II | |
| 7,069,595 B2 | 6/2006 | Cognigni et al. | |
| 7,073,056 B2 | 7/2006 | Kocher | |
| 7,073,063 B2 | 7/2006 | Peinado | |
| 7,076,652 B2 | 7/2006 | Ginter et al. | |
| 7,080,039 B1 | 7/2006 | Marsh | |
| 7,080,043 B2 | 7/2006 | Chase, Jr. | |
| 7,089,309 B2 | 8/2006 | Ramaley | |
| 7,089,594 B2 | 8/2006 | Lai | |
| 7,095,852 B2 | 8/2006 | Wack | |
| 7,096,469 B1 | 8/2006 | Kubala et al. | |
| 7,097,357 B2 | 8/2006 | Johnson et al. | |
| 7,103,574 B1* | 9/2006 | Peinado et al. | 705/51 |
| 7,111,058 B1 | 9/2006 | Nguyen | |
| 7,113,912 B2 | 9/2006 | Stefik | |
| 7,114,168 B1 | 9/2006 | Wyatt et al. | |
| 7,116,969 B2 | 10/2006 | Park | |
| 7,117,183 B2 | 10/2006 | Blair et al. | |
| 7,120,250 B2 | 10/2006 | Candelore | |
| 7,120,873 B2 | 10/2006 | Li | |
| 7,121,460 B1 | 10/2006 | Parsons et al. | |
| 7,123,608 B1 | 10/2006 | Scott | |
| 7,124,938 B1 | 10/2006 | Marsh | |
| 7,127,579 B2 | 10/2006 | Zimmer | |
| 7,130,951 B1 | 10/2006 | Christie et al. | |
| 7,131,004 B1 | 10/2006 | Lyle | |
| 7,133,846 B1 | 11/2006 | Ginter | |
| 7,133,925 B2 | 11/2006 | Mukherjee | |
| 7,136,838 B1 | 11/2006 | Peinado | |
| 7,143,066 B2 | 11/2006 | Shear | |
| 7,143,297 B2 | 11/2006 | Buchheit et al. | |
| 7,143,354 B2 | 11/2006 | Li | |
| 7,146,504 B2 | 12/2006 | Parks | |
| 7,155,475 B2 | 12/2006 | Agnoli | |
| 7,162,645 B2 | 1/2007 | Iguchi et al. | |
| 7,171,539 B2 | 1/2007 | Mansell et al. | |
| 7,174,457 B1 | 2/2007 | England et al. | |
| 7,194,092 B1 | 3/2007 | England | |
| 7,200,680 B2 | 4/2007 | Evans | |
| 7,200,760 B2 | 4/2007 | Riebe | |
| 7,203,310 B2 | 4/2007 | England | |
| 7,203,620 B2 | 4/2007 | Li | |
| 7,203,966 B2 | 4/2007 | Abburi | |
| 7,207,039 B2 | 4/2007 | Komarla et al. | |
| 7,213,005 B2 | 5/2007 | Mourad | |
| 7,213,266 B1 | 5/2007 | Maher et al. | |
| 7,216,363 B2 | 5/2007 | Serkowski | |
| 7,216,368 B2 | 5/2007 | Ishiguro | |
| 7,222,062 B2* | 5/2007 | Goud et al. | 703/23 |
| 7,224,805 B2 | 5/2007 | Hurst | |
| 7,233,666 B2 | 6/2007 | Lee | |
| 7,233,948 B1 | 6/2007 | Shamoon et al. | |
| 7,234,144 B2 | 6/2007 | Wilt et al. | |
| 7,236,455 B1 | 6/2007 | Proudler et al. | |
| 7,254,836 B2 | 8/2007 | Alkove | |
| 7,260,721 B2 | 8/2007 | Tanaka | |
| 7,266,569 B2 | 9/2007 | Cutter et al. | |
| 7,266,714 B2 | 9/2007 | Davies | |
| 7,278,165 B2 | 10/2007 | Molaro | |
| 7,290,699 B2 | 11/2007 | Reddy | |
| 7,296,154 B2 | 11/2007 | Evans | |
| 7,296,296 B2 | 11/2007 | Dunbar | |
| 7,299,292 B2 | 11/2007 | Morten | |
| 7,299,358 B2 | 11/2007 | Chateau et al. | |
| 7,299,504 B1 | 11/2007 | Tiller | |
| 7,310,732 B2 | 12/2007 | Matsuyama | |
| 7,315,941 B2 | 1/2008 | Ramzan | |
| 7,336,791 B2 | 2/2008 | Ishiguro | |
| 7,340,055 B2 | 3/2008 | Hori | |
| 7,343,496 B1 | 3/2008 | Hsiang et al. | |
| 7,350,228 B2 | 3/2008 | Peled | |
| 7,353,209 B1 | 4/2008 | Peinado | |
| 7,353,402 B2 | 4/2008 | Bourne et al. | |
| 7,356,709 B2 | 4/2008 | Gunyakti et al. | |
| 7,359,807 B2 | 4/2008 | Frank et al. | |
| 7,360,253 B2 | 4/2008 | Frank et al. | |
| 7,376,976 B2* | 5/2008 | Fierstein et al. | 726/27 |
| 7,382,879 B1 | 6/2008 | Miller | |
| 7,382,883 B2 | 6/2008 | Cross | |
| 7,383,205 B1 | 6/2008 | Peinado | |
| 7,392,429 B2 | 6/2008 | Westerinen et al. | |
| 7,395,245 B2 | 7/2008 | Okamoto et al. | |
| 7,395,452 B2 | 7/2008 | Nicholson et al. | |
| 7,406,446 B2 | 7/2008 | Frank et al. | |
| 7,406,603 B1 | 7/2008 | MacKay | |
| 7,421,024 B2 | 9/2008 | Castillo | |
| 7,421,413 B2 | 9/2008 | Frank et al. | |
| 7,426,752 B2 | 9/2008 | Agrawal et al. | |
| 7,433,546 B2 | 10/2008 | Marriott | |
| 7,441,121 B2 | 10/2008 | Cutter | |
| 7,441,246 B2 | 10/2008 | Auerbach et al. | |
| 7,451,202 B2 | 11/2008 | Nakahara | |
| 7,461,249 B1 | 12/2008 | Pearson et al. | |
| 7,464,103 B2 | 12/2008 | Siu | |
| 7,474,106 B2 | 1/2009 | Kanno | |
| 7,475,106 B2 | 1/2009 | Agnoli | |
| 7,490,356 B2 | 2/2009 | Lieblich et al. | |
| 7,493,487 B2 | 2/2009 | Phillips et al. | |
| 7,494,277 B2 | 2/2009 | Setala | |
| 7,499,545 B1 | 3/2009 | Bagshaw | |
| 7,500,267 B2* | 3/2009 | McKune et al. | 726/26 |
| 7,502,945 B2 | 3/2009 | Bourne | |
| 7,519,816 B2 | 4/2009 | Phillips et al. | |
| 7,526,649 B2* | 4/2009 | Wiseman et al. | 713/175 |
| 7,539,863 B2 | 5/2009 | Phillips | |
| 7,540,024 B2 | 5/2009 | Phillips et al. | |
| 7,549,060 B2 | 6/2009 | Bourne et al. | |
| 7,552,331 B2 | 6/2009 | Evans | |
| 7,558,463 B2 | 7/2009 | Jain | |
| 7,562,220 B2 | 7/2009 | Frank et al. | |
| 7,565,325 B2 | 7/2009 | Lenard | |
| 7,568,096 B2 | 7/2009 | Evans et al. | |
| 7,574,706 B2 | 8/2009 | Meulemans | |
| 7,574,747 B2 | 8/2009 | Oliveira | |
| 7,584,502 B2 | 9/2009 | Alkove | |
| 7,590,841 B2 | 9/2009 | Sherwani | |
| 7,596,784 B2 | 9/2009 | Abrams | |
| 7,609,653 B2 | 10/2009 | Amin | |
| 7,610,631 B2 | 10/2009 | Frank et al. | |
| 7,617,401 B2 | 11/2009 | Marsh et al. | |
| 7,644,239 B2 | 1/2010 | Westerinen et al. | |
| 7,653,943 B2 | 1/2010 | Evans | |
| 7,665,143 B2 | 2/2010 | Havens | |
| 7,669,056 B2 | 2/2010 | Frank | |
| 7,676,976 B2 | 3/2010 | Dueck et al. | |
| 7,680,744 B2 | 3/2010 | Blinn | |
| 7,694,153 B2 | 4/2010 | Ahdout | |
| 7,703,141 B2 | 4/2010 | Alkove | |
| 7,739,505 B2 | 6/2010 | Reneris | |
| 7,752,674 B2 | 7/2010 | Evans | |
| 7,769,174 B2 | 8/2010 | Cho et al. | |
| 7,770,205 B2 | 8/2010 | Frank | |
| 7,809,646 B2 | 10/2010 | Rose | |
| 7,810,163 B2 | 10/2010 | Evans | |
| 7,814,532 B2 | 10/2010 | Cromer et al. | |
| 7,822,863 B2 | 10/2010 | Balfanz | |
| 7,860,250 B2 | 12/2010 | Russ | |
| 7,877,607 B2 | 1/2011 | Circenis | |
| 7,881,315 B2 | 2/2011 | Haveson | |
| 7,891,007 B2 | 2/2011 | Waxman et al. | |
| 7,900,140 B2 | 3/2011 | Mohammed | |
| 7,903,117 B2 | 3/2011 | Howell | |
| 7,958,029 B1 | 6/2011 | Bobich et al. | |
| 7,979,721 B2 | 7/2011 | Westerinen | |
| 8,060,923 B2 | 11/2011 | Cutter | |
| 8,074,287 B2 | 12/2011 | Barde et al. | |
| 8,095,985 B2 | 1/2012 | Dunbar et al. | |
| 8,176,564 B2 | 5/2012 | Frank | |
| 8,248,423 B2 | 8/2012 | Howell et al. | |

(56) References Cited

U.S. PATENT DOCUMENTS

| | | |
|---|---|---|
| 8,347,078 B2 | 1/2013 | Jain et al. |
| 2001/0010076 A1 | 7/2001 | Wray |
| 2001/0021252 A1 | 9/2001 | Carter et al. |
| 2001/0033619 A1 | 10/2001 | Hanamura |
| 2001/0034711 A1 | 10/2001 | Tashenberg |
| 2001/0044782 A1 | 11/2001 | Hughes et al. |
| 2001/0049667 A1 | 12/2001 | Moribatake |
| 2001/0051996 A1 | 12/2001 | Cooper |
| 2001/0052077 A1 | 12/2001 | Fung |
| 2001/0053223 A1 | 12/2001 | Ishibashi |
| 2001/0056539 A1 | 12/2001 | Pavlin et al. |
| 2002/0002597 A1 | 1/2002 | Morrell, Jr. |
| 2002/0002674 A1 | 1/2002 | Grimes |
| 2002/0007310 A1 | 1/2002 | Long |
| 2002/0010863 A1 | 1/2002 | Mankefors |
| 2002/0012432 A1 | 1/2002 | England |
| 2002/0013772 A1 | 1/2002 | Peinado |
| 2002/0019814 A1 | 2/2002 | Ganesan |
| 2002/0023207 A1 | 2/2002 | Olik |
| 2002/0023212 A1 | 2/2002 | Proudler |
| 2002/0026574 A1 | 2/2002 | Watanabe |
| 2002/0035723 A1 | 3/2002 | Inoue |
| 2002/0036991 A1 | 3/2002 | Inoue |
| 2002/0044654 A1 | 4/2002 | Maeda |
| 2002/0046098 A1 | 4/2002 | Maggio |
| 2002/0049679 A1 | 4/2002 | Russell et al. |
| 2002/0055906 A1 | 5/2002 | Katz et al. |
| 2002/0057795 A1 | 5/2002 | Spurgat |
| 2002/0059518 A1 | 5/2002 | Smeets |
| 2002/0063933 A1 | 5/2002 | Maeda |
| 2002/0065781 A1 | 5/2002 | Hillegass |
| 2002/0073068 A1 | 6/2002 | Guha |
| 2002/0082939 A1 | 6/2002 | Clark et al. |
| 2002/0091569 A1 | 7/2002 | Kitaura et al. |
| 2002/0095603 A1 | 7/2002 | Godwin et al. |
| 2002/0097872 A1 | 7/2002 | Maliszewski |
| 2002/0103880 A1 | 8/2002 | Konetski |
| 2002/0104096 A1 | 8/2002 | Cramer |
| 2002/0107701 A1 | 8/2002 | Batty et al. |
| 2002/0111916 A1 | 8/2002 | Coronna et al. |
| 2002/0112171 A1 | 8/2002 | Ginter et al. |
| 2002/0116707 A1 | 8/2002 | Morris |
| 2002/0118835 A1 | 8/2002 | Uemura |
| 2002/0123964 A1 | 9/2002 | Kramer et al. |
| 2002/0124212 A1 | 9/2002 | Nitschke et al. |
| 2002/0129359 A1 | 9/2002 | Lichner |
| 2002/0138549 A1 | 9/2002 | Urien |
| 2002/0141451 A1 | 10/2002 | Gates et al. |
| 2002/0144131 A1 | 10/2002 | Spacey |
| 2002/0147601 A1 | 10/2002 | Fagan |
| 2002/0147782 A1 | 10/2002 | Dimitrova et al. |
| 2002/0147912 A1 | 10/2002 | Shmueli et al. |
| 2002/0164018 A1 | 11/2002 | Wee |
| 2002/0169974 A1 | 11/2002 | McKune |
| 2002/0178071 A1 | 11/2002 | Walker et al. |
| 2002/0184482 A1 | 12/2002 | Lacombe et al. |
| 2002/0184508 A1 | 12/2002 | Bialick et al. |
| 2002/0186843 A1 | 12/2002 | Weinstein |
| 2002/0193101 A1 | 12/2002 | McAlinden |
| 2002/0194132 A1 | 12/2002 | Pearson et al. |
| 2002/0194482 A1 | 12/2002 | Griffin et al. |
| 2002/0198845 A1 | 12/2002 | Lao |
| 2002/0198846 A1 | 12/2002 | Lao |
| 2003/0004880 A1 | 1/2003 | Banerjee |
| 2003/0005135 A1 | 1/2003 | Inoue et al. |
| 2003/0005335 A1 | 1/2003 | Watanabe |
| 2003/0014323 A1 | 1/2003 | Scheer |
| 2003/0014496 A1 | 1/2003 | Spencer |
| 2003/0021416 A1 | 1/2003 | Brown |
| 2003/0023564 A1 | 1/2003 | Padhye |
| 2003/0027549 A1 | 2/2003 | Kiel et al. |
| 2003/0028454 A1 | 2/2003 | Ooho et al. |
| 2003/0028488 A1 | 2/2003 | Mohammed |
| 2003/0028643 A1 | 2/2003 | Jabri |
| 2003/0035409 A1 | 2/2003 | Wang et al. |
| 2003/0037246 A1 | 2/2003 | Goodman et al. |
| 2003/0040960 A1 | 2/2003 | Eckmann |
| 2003/0041008 A1 | 2/2003 | Grey |
| 2003/0046026 A1 | 3/2003 | Levy et al. |
| 2003/0046238 A1 | 3/2003 | Nonaka |
| 2003/0048026 A1 | 3/2003 | Kershaw et al. |
| 2003/0048473 A1 | 3/2003 | Rosen |
| 2003/0055898 A1 | 3/2003 | Yeager |
| 2003/0056107 A1 | 3/2003 | Cammack et al. |
| 2003/0065918 A1 | 4/2003 | Willey |
| 2003/0069854 A1 | 4/2003 | Hsu |
| 2003/0069981 A1 | 4/2003 | Trovato |
| 2003/0078853 A1 | 4/2003 | Peinado |
| 2003/0084104 A1 | 5/2003 | Salem et al. |
| 2003/0084278 A1 | 5/2003 | Cromer et al. |
| 2003/0084285 A1 | 5/2003 | Cromer et al. |
| 2003/0084306 A1 | 5/2003 | Abburi |
| 2003/0084337 A1 | 5/2003 | Simionescu et al. |
| 2003/0084352 A1 | 5/2003 | Schwartz et al. |
| 2003/0088500 A1 | 5/2003 | Shinohara et al. |
| 2003/0093694 A1 | 5/2003 | Medvinsky et al. |
| 2003/0097596 A1 | 5/2003 | Muratov et al. |
| 2003/0097655 A1 | 5/2003 | Novak |
| 2003/0110388 A1 | 6/2003 | Pavlin et al. |
| 2003/0115147 A1 | 6/2003 | Feldman |
| 2003/0115458 A1 | 6/2003 | Song |
| 2003/0120935 A1 | 6/2003 | Teal et al. |
| 2003/0126086 A1 | 7/2003 | Safadi |
| 2003/0126519 A1 | 7/2003 | Odorcic |
| 2003/0126608 A1 | 7/2003 | Safadi et al. |
| 2003/0131252 A1 | 7/2003 | Barton |
| 2003/0133576 A1 | 7/2003 | Grumiaux |
| 2003/0135380 A1 | 7/2003 | Lehr et al. |
| 2003/0149670 A1 | 8/2003 | Cronce |
| 2003/0149671 A1 | 8/2003 | Yamamoto et al. |
| 2003/0156572 A1 | 8/2003 | Hui et al. |
| 2003/0156719 A1 | 8/2003 | Cronce |
| 2003/0159037 A1 | 8/2003 | Taki |
| 2003/0163383 A1 | 8/2003 | Engelhart |
| 2003/0163712 A1 | 8/2003 | LaMothe et al. |
| 2003/0165241 A1 | 9/2003 | Fransdonk |
| 2003/0172376 A1 | 9/2003 | Coffin, III |
| 2003/0183597 A1 | 10/2003 | Christophe et al. |
| 2003/0185395 A1 | 10/2003 | Lee |
| 2003/0188165 A1 | 10/2003 | Sutton et al. |
| 2003/0188179 A1 | 10/2003 | Challener |
| 2003/0194094 A1 | 10/2003 | Lampson |
| 2003/0196102 A1 | 10/2003 | McCarroll |
| 2003/0196106 A1 | 10/2003 | Erfani et al. |
| 2003/0198350 A1 | 10/2003 | Foster |
| 2003/0200336 A1 | 10/2003 | Pal et al. |
| 2003/0208338 A1 | 11/2003 | Challener et al. |
| 2003/0208573 A1 | 11/2003 | Harrison et al. |
| 2003/0219127 A1 | 11/2003 | Russ |
| 2003/0221100 A1 | 11/2003 | Russ |
| 2003/0229702 A1 | 12/2003 | Hensbergen et al. |
| 2003/0233553 A1 | 12/2003 | Parks |
| 2003/0236978 A1 | 12/2003 | Evans et al. |
| 2004/0001088 A1 | 1/2004 | Stancil et al. |
| 2004/0001594 A1 | 1/2004 | Krishnaswamy |
| 2004/0003190 A1 | 1/2004 | Childs et al. |
| 2004/0003268 A1 | 1/2004 | Bourne et al. |
| 2004/0003269 A1 | 1/2004 | Waxman et al. |
| 2004/0003270 A1 | 1/2004 | Bourne et al. |
| 2004/0003288 A1 | 1/2004 | Wiseman et al. |
| 2004/0010440 A1 | 1/2004 | Lenard et al. |
| 2004/0010717 A1 | 1/2004 | Simec |
| 2004/0019456 A1 | 1/2004 | Circenis |
| 2004/0023636 A1 | 2/2004 | Gurel et al. |
| 2004/0030912 A1 | 2/2004 | Merkle, Jr. et al. |
| 2004/0034816 A1 | 2/2004 | Richard |
| 2004/0039916 A1 | 2/2004 | Aldis et al. |
| 2004/0039924 A1 | 2/2004 | Baldwin et al. |
| 2004/0039960 A1 | 2/2004 | Kassayan |
| 2004/0044629 A1 | 3/2004 | Rhodes et al. |
| 2004/0054629 A1 | 3/2004 | de Jong |
| 2004/0054678 A1 | 3/2004 | Okamoto |
| 2004/0054907 A1 | 3/2004 | Chateau et al. |
| 2004/0054908 A1 | 3/2004 | Circenis et al. |

(56) References Cited

U.S. PATENT DOCUMENTS

| | | |
|---|---|---|
| 2004/0054909 A1 | 3/2004 | Serkowski et al. |
| 2004/0059937 A1 | 3/2004 | Takehiko |
| 2004/0064351 A1 | 4/2004 | Mikurak |
| 2004/0064707 A1 | 4/2004 | McCann et al. |
| 2004/0067746 A1 | 4/2004 | Johnson |
| 2004/0073670 A1 | 4/2004 | Chack |
| 2004/0088548 A1 | 5/2004 | Smetters et al. |
| 2004/0093371 A1 | 5/2004 | Burrows et al. |
| 2004/0093508 A1 | 5/2004 | Foerstner et al. |
| 2004/0098583 A1 | 5/2004 | Weber |
| 2004/0098586 A1 | 5/2004 | Weber |
| 2004/0107125 A1 | 6/2004 | Guheen |
| 2004/0107356 A1 | 6/2004 | Shamoon et al. |
| 2004/0107359 A1 | 6/2004 | Kawano et al. |
| 2004/0107368 A1 | 6/2004 | Colvin |
| 2004/0111609 A1 | 6/2004 | Kaji |
| 2004/0111615 A1 | 6/2004 | Nyang |
| 2004/0123127 A1 | 6/2004 | Teicher et al. |
| 2004/0125755 A1 | 7/2004 | Roberts |
| 2004/0128251 A1 | 7/2004 | Chris et al. |
| 2004/0133794 A1 | 7/2004 | Kocher et al. |
| 2004/0139027 A1 | 7/2004 | Molaro |
| 2004/0139312 A1 | 7/2004 | Medvinsky |
| 2004/0146015 A1 | 7/2004 | Cross |
| 2004/0158742 A1 | 8/2004 | Srinivasan et al. |
| 2004/0184605 A1 | 9/2004 | Soliman |
| 2004/0187001 A1 | 9/2004 | Bousis |
| 2004/0193648 A1 | 9/2004 | Lai |
| 2004/0193919 A1 | 9/2004 | Dabbish et al. |
| 2004/0196975 A1 | 10/2004 | Zhu |
| 2004/0199769 A1 | 10/2004 | Proudler |
| 2004/0205028 A1 | 10/2004 | Verosub et al. |
| 2004/0205357 A1 | 10/2004 | Kuo et al. |
| 2004/0205510 A1 | 10/2004 | Rising |
| 2004/0210695 A1 | 10/2004 | Weber |
| 2004/0220858 A1 | 11/2004 | Maggio |
| 2004/0225894 A1 | 11/2004 | Colvin |
| 2004/0249768 A1 | 12/2004 | Kontio |
| 2004/0255000 A1 | 12/2004 | Simionescu et al. |
| 2004/0268120 A1 | 12/2004 | Mirtal et al. |
| 2005/0015343 A1 | 1/2005 | Nagai et al. |
| 2005/0021859 A1 | 1/2005 | Willian |
| 2005/0021944 A1 | 1/2005 | Craft et al. |
| 2005/0021992 A1 | 1/2005 | Aida et al. |
| 2005/0028000 A1 | 2/2005 | Bulusu et al. |
| 2005/0033747 A1 | 2/2005 | Wittkotter |
| 2005/0039013 A1 | 2/2005 | Bajikar et al. |
| 2005/0044197 A1 | 2/2005 | Lai |
| 2005/0044397 A1 | 2/2005 | Bjorkengren |
| 2005/0050355 A1 | 3/2005 | Graunke |
| 2005/0060388 A1 | 3/2005 | Tatsumi et al. |
| 2005/0060542 A1 | 3/2005 | Risan |
| 2005/0065880 A1 | 3/2005 | Amato et al. |
| 2005/0066353 A1 | 3/2005 | Fransdonk |
| 2005/0071280 A1 | 3/2005 | Irwin et al. |
| 2005/0080701 A1 | 4/2005 | Tunney et al. |
| 2005/0086174 A1 | 4/2005 | Eng |
| 2005/0089164 A1 | 4/2005 | Lang |
| 2005/0091104 A1 | 4/2005 | Abraham |
| 2005/0091488 A1 | 4/2005 | Dunbar |
| 2005/0091526 A1 | 4/2005 | Alkove |
| 2005/0097204 A1 | 5/2005 | Horowitz et al. |
| 2005/0102181 A1 | 5/2005 | Scroggie et al. |
| 2005/0108547 A1 | 5/2005 | Sakai |
| 2005/0108564 A1 | 5/2005 | Freeman et al. |
| 2005/0120125 A1 | 6/2005 | Morten |
| 2005/0120251 A1 | 6/2005 | Fukumori |
| 2005/0123276 A1 | 6/2005 | Sugaya |
| 2005/0125673 A1 | 6/2005 | Cheng et al. |
| 2005/0129296 A1 | 6/2005 | Setala |
| 2005/0131832 A1 | 6/2005 | Fransdonk |
| 2005/0132150 A1 | 6/2005 | Jewell et al. |
| 2005/0138370 A1 | 6/2005 | Goud et al. |
| 2005/0138389 A1 | 6/2005 | Catherman et al. |
| 2005/0138406 A1 | 6/2005 | Cox |
| 2005/0138423 A1 | 6/2005 | Ranganathan |
| 2005/0141717 A1 | 6/2005 | Cromer et al. |
| 2005/0144099 A1 | 6/2005 | Deb et al. |
| 2005/0149722 A1* | 7/2005 | Wiseman et al. ............ 713/155 |
| 2005/0149729 A1 | 7/2005 | Zimmer et al. |
| 2005/0166051 A1 | 7/2005 | Buer |
| 2005/0172121 A1 | 8/2005 | Risan et al. |
| 2005/0182921 A1 | 8/2005 | Duncan |
| 2005/0182940 A1 | 8/2005 | Sutton |
| 2005/0188843 A1 | 9/2005 | Edlund et al. |
| 2005/0198510 A1 | 9/2005 | Robert |
| 2005/0203801 A1 | 9/2005 | Morgenstern et al. |
| 2005/0204205 A1 | 9/2005 | Ring |
| 2005/0210252 A1 | 9/2005 | Freeman et al. |
| 2005/0213761 A1 | 9/2005 | Walmsley et al. |
| 2005/0216577 A1 | 9/2005 | Durham et al. |
| 2005/0221766 A1 | 10/2005 | Brizek et al. |
| 2005/0226170 A1 | 10/2005 | Relan |
| 2005/0235141 A1 | 10/2005 | Ibrahim et al. |
| 2005/0239434 A1 | 10/2005 | Marlowe |
| 2005/0240533 A1 | 10/2005 | Cutter et al. |
| 2005/0240985 A1 | 10/2005 | Alkove |
| 2005/0246521 A1 | 11/2005 | Bade et al. |
| 2005/0246525 A1 | 11/2005 | Bade et al. |
| 2005/0246552 A1 | 11/2005 | Bade et al. |
| 2005/0251803 A1 | 11/2005 | Turner |
| 2005/0257073 A1 | 11/2005 | Bade |
| 2005/0262022 A1 | 11/2005 | Oliveira |
| 2005/0265549 A1 | 12/2005 | Sugiyama |
| 2005/0268115 A1* | 12/2005 | Barde et al. ................. 713/189 |
| 2005/0268174 A1 | 12/2005 | Kumagai |
| 2005/0275866 A1 | 12/2005 | Corlett |
| 2005/0278519 A1 | 12/2005 | Luebke et al. |
| 2005/0279827 A1 | 12/2005 | Mascavage et al. |
| 2005/0283601 A1 | 12/2005 | Tahan |
| 2005/0286476 A1 | 12/2005 | Crosswy et al. |
| 2005/0289177 A1 | 12/2005 | Hohmann, II et al. |
| 2005/0289343 A1 | 12/2005 | Tahan |
| 2006/0008256 A1 | 1/2006 | Khedouri |
| 2006/0010074 A1 | 1/2006 | Zeitsiff et al. |
| 2006/0010076 A1 | 1/2006 | Cutter |
| 2006/0010326 A1 | 1/2006 | Bade et al. |
| 2006/0015717 A1 | 1/2006 | Liu et al. |
| 2006/0015718 A1 | 1/2006 | Liu et al. |
| 2006/0015732 A1 | 1/2006 | Liu |
| 2006/0020784 A1 | 1/2006 | Jonker et al. |
| 2006/0020821 A1 | 1/2006 | Waltermann et al. |
| 2006/0020860 A1 | 1/2006 | Tardif et al. |
| 2006/0026418 A1 | 2/2006 | Bade |
| 2006/0026419 A1 | 2/2006 | Arndt et al. |
| 2006/0026422 A1 | 2/2006 | Bade et al. |
| 2006/0041943 A1 | 2/2006 | Singer |
| 2006/0045267 A1 | 3/2006 | Moore et al. |
| 2006/0053112 A1 | 3/2006 | Chitkara |
| 2006/0055506 A1 | 3/2006 | Nicolas |
| 2006/0072748 A1 | 4/2006 | Buer |
| 2006/0072762 A1 | 4/2006 | Buer |
| 2006/0074600 A1 | 4/2006 | Sastry et al. |
| 2006/0075014 A1 | 4/2006 | Tharappel et al. |
| 2006/0075223 A1 | 4/2006 | Bade et al. |
| 2006/0085634 A1 | 4/2006 | Jain et al. |
| 2006/0085637 A1 | 4/2006 | Pinkas |
| 2006/0085844 A1 | 4/2006 | Buer et al. |
| 2006/0089917 A1 | 4/2006 | Strom et al. |
| 2006/0090084 A1 | 4/2006 | Buer |
| 2006/0100010 A1 | 5/2006 | Gatto et al. |
| 2006/0106845 A1 | 5/2006 | Frank et al. |
| 2006/0106920 A1 | 5/2006 | Steeb et al. |
| 2006/0107306 A1 | 5/2006 | Thirumalai et al. |
| 2006/0107328 A1 | 5/2006 | Frank et al. |
| 2006/0107335 A1 | 5/2006 | Frank et al. |
| 2006/0112267 A1 | 5/2006 | Zimmer et al. |
| 2006/0117177 A1 | 6/2006 | Buer |
| 2006/0129496 A1 | 6/2006 | Chow et al. |
| 2006/0129824 A1 | 6/2006 | Hoff et al. |
| 2006/0130130 A1 | 6/2006 | Kablotsky |
| 2006/0143431 A1 | 6/2006 | Rothman et al. |
| 2006/0149966 A1 | 7/2006 | Buskey et al. |
| 2006/0156008 A1 | 7/2006 | Frank |

(56) References Cited

U.S. PATENT DOCUMENTS

| | | |
|---|---|---|
| 2006/0156416 A1 | 7/2006 | Huotari et al. |
| 2006/0165005 A1 | 7/2006 | Frank et al. |
| 2006/0165227 A1 | 7/2006 | Steeb |
| 2006/0167814 A1 | 7/2006 | Peinado |
| 2006/0167815 A1 | 7/2006 | Peinado |
| 2006/0168664 A1 | 7/2006 | Frank et al. |
| 2006/0173787 A1 | 8/2006 | Weber et al. |
| 2006/0174110 A1 | 8/2006 | Strom |
| 2006/0206618 A1 | 9/2006 | Zimmer et al. |
| 2006/0212363 A1 | 9/2006 | Peinado |
| 2006/0212945 A1 | 9/2006 | Donlin |
| 2006/0213997 A1 | 9/2006 | Frank et al. |
| 2006/0229990 A1 | 10/2006 | Shimoji |
| 2006/0230042 A1 | 10/2006 | Butler |
| 2006/0235798 A1 | 10/2006 | Alkove |
| 2006/0235799 A1 | 10/2006 | Evans |
| 2006/0235801 A1 | 10/2006 | Strom |
| 2006/0242406 A1* | 10/2006 | Barde et al. .................. 713/164 |
| 2006/0248594 A1 | 11/2006 | Grigorovitch et al. |
| 2006/0248596 A1 | 11/2006 | Jain |
| 2006/0265758 A1 | 11/2006 | Khandelwal |
| 2006/0282319 A1 | 12/2006 | Maggio |
| 2006/0282899 A1 | 12/2006 | Raciborski |
| 2007/0033102 A1 | 2/2007 | Frank et al. |
| 2007/0058718 A1 | 3/2007 | Shen |
| 2007/0058807 A1 | 3/2007 | Marsh |
| 2007/0153910 A1 | 7/2007 | Levett |
| 2007/0280422 A1 | 12/2007 | Setala |
| 2007/0297426 A1 | 12/2007 | Haveson |
| 2008/0256647 A1 | 10/2008 | Kim |
| 2009/0070454 A1 | 3/2009 | McKinnon, III et al. |
| 2009/0132815 A1 | 5/2009 | Ginter |
| 2009/0158036 A1 | 6/2009 | Barde et al. |
| 2010/0146576 A1 | 6/2010 | Costanzo |
| 2010/0177891 A1 | 7/2010 | Keidar et al. |
| 2010/0250927 A1 | 9/2010 | Bradley |
| 2011/0128290 A1 | 6/2011 | Howell |
| 2012/0137127 A1 | 5/2012 | Jain |
| 2016/0006714 A1 | 1/2016 | Grigorovitch et al. |

FOREIGN PATENT DOCUMENTS

| | | |
|---|---|---|
| CN | 1393783 | 1/2003 |
| CN | 1531673 | 9/2004 |
| EP | 0635790 | 1/1995 |
| EP | 0665486 A2 | 1/1995 |
| EP | 0 665 486 | 8/1995 |
| EP | 0 709 760 | 5/1996 |
| EP | 0709760 B1 | 5/1996 |
| EP | 0 715 245 | 6/1996 |
| EP | 0715245 B1 | 6/1996 |
| EP | 0 725 512 | 8/1996 |
| EP | 0725512 B1 | 8/1996 |
| EP | 0 752 663 | 1/1997 |
| EP | 0752663 B1 | 1/1997 |
| EP | 0789361 A2 | 8/1997 |
| EP | 0 798 892 | 10/1997 |
| EP | 0798892 B1 | 10/1997 |
| EP | 0843449 | 5/1998 |
| EP | 0 849 658 | 6/1998 |
| EP | 0849658 A2 | 6/1998 |
| EP | 0 874 300 | 10/1998 |
| EP | 0874300 B1 | 10/1998 |
| EP | 0 887 723 | 12/1998 |
| EP | 0887723 A2 | 12/1998 |
| EP | 1 045 388 | 10/2000 |
| EP | 1061465 | 12/2000 |
| EP | 1 083 480 | 3/2001 |
| EP | 1085396 | 3/2001 |
| EP | 1 128 342 | 8/2001 |
| EP | 1120967 | 8/2001 |
| EP | 1 130 492 | 9/2001 |
| EP | 1 191 422 | 3/2002 |
| EP | 1 253 740 | 10/2002 |
| EP | 1253740 A1 | 10/2002 |
| EP | 1 287 636 | 3/2003 |
| EP | 1 292 065 | 3/2003 |
| EP | 1292065 A1 | 3/2003 |
| EP | 1 338 992 | 8/2003 |
| EP | 1 363 424 | 11/2003 |
| EP | 1363424 B1 | 11/2003 |
| EP | 1 376 302 | 1/2004 |
| EP | 1 378 811 | 1/2004 |
| EP | 1378811 A1 | 1/2004 |
| EP | 1387237 | 2/2004 |
| EP | 1429224 | 6/2004 |
| EP | 1223722 | 8/2004 |
| EP | 1460514 | 9/2004 |
| EP | 1320973 B1 | 3/2005 |
| EP | 1233337 | 8/2005 |
| EP | 1 582 962 | 10/2005 |
| EP | 2492774 A3 | 8/2012 |
| GB | 2359969 | 9/2001 |
| GB | 2378780 | 2/2003 |
| JP | 02-291043 | 11/1990 |
| JP | H0535461 | 2/1993 |
| JP | H0635718 | 2/1994 |
| JP | H07036559 | 2/1995 |
| JP | H07141153 | 6/1995 |
| JP | H086729 | 1/1996 |
| JP | 09-006880 | 1/1997 |
| JP | 2001526550 | 5/1997 |
| JP | H09185504 | 7/1997 |
| JP | H9251494 | 9/1997 |
| JP | 09-069044 | 11/1997 |
| JP | 2000-215165 | 8/2000 |
| JP | 2000-215165 A | 8/2000 |
| JP | 2000-242491 | 9/2000 |
| JP | 2000293369 | 10/2000 |
| JP | 2000-347566 A | 12/2000 |
| JP | 2001051742 | 2/2001 |
| JP | 2001-075870 | 3/2001 |
| JP | 2003510684 | 3/2001 |
| JP | 2001101033 | 4/2001 |
| JP | 2003510713 | 4/2001 |
| JP | 2001-175605 | 6/2001 |
| JP | 2001-175605 A | 6/2001 |
| JP | 2001-175606 | 6/2001 |
| JP | 2001184472 | 7/2001 |
| JP | 2001-290650 | 10/2001 |
| JP | 2001-290780 A | 10/2001 |
| JP | 2001-325387 A | 11/2001 |
| JP | 2001312325 | 11/2001 |
| JP | 2001331229 | 11/2001 |
| JP | 2001338233 | 12/2001 |
| JP | 2002108478 | 4/2002 |
| JP | 2002108870 | 4/2002 |
| JP | 2002-164880 A | 6/2002 |
| JP | 2002374327 | 12/2002 |
| JP | 2003-058660 | 2/2003 |
| JP | 2003507785 | 2/2003 |
| JP | 2003-101526 | 4/2003 |
| JP | 2003-115017 | 4/2003 |
| JP | 2003140761 | 5/2003 |
| JP | 2003140762 | 5/2003 |
| JP | 2003157335 | 5/2003 |
| JP | 3421950 B2 | 6/2003 |
| JP | 2003208314 | 7/2003 |
| JP | 2003248522 | 9/2003 |
| JP | 2003-284024 | 10/2003 |
| JP | 2003296487 | 10/2003 |
| JP | 2003-330560 | 11/2003 |
| JP | 2002182562 | 1/2004 |
| JP | 2004-062886 | 2/2004 |
| JP | 2004062561 | 2/2004 |
| JP | 2004118327 | 4/2004 |
| JP | 2004164491 | 6/2004 |
| JP | 2004295846 | 10/2004 |
| JP | 2004304755 | 10/2004 |
| JP | 2007525774 | 9/2007 |
| JP | H08-054952 | 2/2011 |
| KR | 239865 B1 | 1/2000 |
| KR | 20010000805 | 1/2001 |
| KR | 20020037453 | 5/2002 |

(56) References Cited

FOREIGN PATENT DOCUMENTS

| | | |
|---|---|---|
| KR | 10-0879907 | 10/2002 |
| KR | 1020040098627 | 11/2004 |
| KR | 20050008439 | 1/2005 |
| KR | 20050021782 | 3/2005 |
| KR | 100879907 | 1/2009 |
| MY | 138640 A | 5/2003 |
| RU | 2144269 C1 | 1/2000 |
| RU | 2163056 C2 | 2/2001 |
| RU | 2 207 618 | 6/2003 |
| TW | 200508970 | 3/2005 |
| WO | WO-9721162 | 6/1997 |
| WO | WO-9811478 | 3/1998 |
| WO | 9837481 A1 | 8/1998 |
| WO | 98/42098 | 9/1998 |
| WO | 99/15970 | 4/1999 |
| WO | 99/53689 | 10/1999 |
| WO | 00/08909 | 2/2000 |
| WO | WO-0054126 | 9/2000 |
| WO | 00/57684 | 10/2000 |
| WO | 00/58810 | 10/2000 |
| WO | 00/58811 | 10/2000 |
| WO | 00/58859 | 10/2000 |
| WO | 00/59150 | 10/2000 |
| WO | 00/59152 | 10/2000 |
| WO | WO-0135293 | 5/2001 |
| WO | 01/44908 | 6/2001 |
| WO | 01/44908 A1 | 6/2001 |
| WO | 01/46783 A2 | 6/2001 |
| WO | WO-0145012 | 6/2001 |
| WO | 01/52020 A1 | 7/2001 |
| WO | 01/52021 | 7/2001 |
| WO | 0152020 A1 | 7/2001 |
| WO | WO01/52020 | 7/2001 |
| WO | WO-0177795 | 10/2001 |
| WO | WO-0193461 | 12/2001 |
| WO | WO-01093461 | 12/2001 |
| WO | WO-0208969 | 1/2002 |
| WO | WO02/19598 | 3/2002 |
| WO | 02/28006 | 4/2002 |
| WO | 02/37371 | 5/2002 |
| WO | 02/057865 | 7/2002 |
| WO | WO-02056155 | 7/2002 |
| WO | 02/088991 | 11/2002 |
| WO | WO-02103495 | 12/2002 |
| WO | WO-03009115 | 1/2003 |
| WO | 03/034313 | 4/2003 |
| WO | WO-03030434 | 4/2003 |
| WO | 03/058508 | 7/2003 |
| WO | WO03/073688 | 9/2003 |
| WO | WO03/107588 | 12/2003 |
| WO | WO-03107585 | 12/2003 |
| WO | 2004008407 A1 | 9/2004 |
| WO | WO-20040928861 | 10/2004 |
| WO | 2004/097606 | 11/2004 |
| WO | 2004/102459 | 11/2004 |
| WO | 2005010763 A1 | 2/2005 |
| WO | 2006/065012 | 6/2006 |
| WO | 2006/115533 | 11/2006 |

OTHER PUBLICATIONS

Schneier, Bruce. "Applied Cryptography, Second Edition" © 1996 John Wiley and Sons Inc. (pp. 32-34, & 180).*
A. Menezes et al. "Handbook of Applied Cryptography" © 1997 CRC Press LLC. (pp. 33 and 489-541).*
Schneier, Bruce. "Applied Cryptography. $2^{nd}$ Edition" © 1996 Bruce Schneier. Published by John Wiley and Sons Inc. (pp. 32-34).*
U.S. Appl. No. 10/835,951, Jeffrey R. McKune et al.
U.S. Appl. No. 11/116,598, Kirt A. Debique et al.
U.S. Appl. No. 11/191,448, Sohail Baig Mohammed et al.
U.S. Appl. No. 09/290,363, Arnold N. Blinn et al.
European Search Report from EP03011235.3; Dec. 23, 2004; 7 pp.
"Using Windows Media Rights Manager to Protect and Distribute Digital Media"; Windows Media Technologies [Online]; Dec. 1, 2001; XP002307161; Retrieved from the Internet URL http://msdn.microsoft.com/msdnmag/issues/01/12/DRM/print.asp.
Bajikar, S.; "Trusted Platform Module (TPM) based Security on Notebook PCs—White Paper"; Mobile Platforms Group Intel Corporation; Jun. 20, 2002; XP002259678; Retrieved from the Internet URL http://www.intel.com/design/mobile/platform/downloads/Trusted_Platform_Module_White_Paper.pdf.
Intel, IBM, Matsushita, Toshiba: "Content Protection System Architecture a comprehensive Framework for Content Protection"; Content Protection System Architecture; Feb. 17, 2000; XP02259679; Retrieved from the Internet URL http://www.4centity.com/data/tech/cpsa/cpsa081.pdf.
"Overview of Security of Windows Media Right Manager"; Microsoft; Dec. 3, 2001; URL: http://msdn.microsoft.com/ja-jp/library/dd148624.aspx.
Pruneda, Andrea; "Windows Media Technologies: Using Windows Media Rights Manager to Protect and Distribute Digital Media"; MDSN Magazine Japanese Version; ASCII Corporation, Japan; Jan. 18, 2002; No. 22; pp. 68-82.
Shi, Changgui et al.; "A Fast MPEG Video Encryption Algorithm"; 1998; Bristol, UK; pp. 81-88.
International Search Report from PCT/US06/10664; Oct. 23, 2007; 9 pp.
International Search Report from PCT/US06/10327; Oct. 22, 2007; 7 pp.
Arbaugh, et al.; "A Secure and Reliable Bootstrap Architecture"; IEEE Symposium on Security and Privacy; May 1971; pp. 65-71.
Oh, Kyung-Seok, et al.; "Acceleration technique for volume rendering using 2D texture based ray plane casting on GPU"; 2006 International Conference on Computational Intelligence and Security; vol. 2; Nov. 3-6, 2006; pp. 1755-1758.
Slusallek, P., et al.; "Vision—An Architecture for Global Illumination Calculations"; IEEE Transactions on Visualization and Computer Graphics; vol. 1, No. 1; Mar. 1995; pp. 77-96.
Zhao, Hua, et al.; "A New Watermarking Scheme for CAD Engineering Drawings"; 9th International Conference on Computer-Aided Industrial Design and Conceptual Design; CAID/CD 2008; Nov. 22-25, 2008; pp. 518-522.
International Search Report and Written Opinion for PCT/US05/30490 issued Sep. 18, 2007, 9 pgs.
CN Patent Appln. 200810189718.4; Second Office Action dated Apr. 13, 2011 (and English translation).
CN Patent Appln . 200810189719.9; Second Office Action dated Apr. 2, 2011 (and English translation).
International Search Report and Written Opinion for PCT/US05/30489 issued Aug. 2, 2007, 9 pgs.
DMOD WorkSpace OEM Unique Features; http://www.dmod.com/oem_features; Retrieved Jan. 12, 2005.
Lotspiech, J. et al.; "Broadcast Encryption's Bright Future"; Computer; 2002; 35 (8); 57-63.
Memon, N. et al.; "Protecting Digital Media Content"; Communications of the ACM; 1998; 41 (7); 34-43.
Ripley, M. et al.; "Content Protection in the Digital Home"; Intel Technology J.; 2002; 6(4); 49-56.
Shen, Kuan-Ting et al.; "A New Digital Watermarking Technique for Video"; Recent Advances in Visual Information Systems; $5^{th}$ International Conference, Visual 2002 Proceedings, Hsin Chu, Taiwan; Mar. 11-13, 2002; 2314; 269-275.
Steinebach, M. et al.; "Digital Watermarking Basics—Applications—Limits"; NFD Information; Wissenschaft and Praxis; Jul. 2002; 53(5); 261-268.
CN Patent Appln. 200580049524.9 Second Office Action dated Jun. 15, 2011 (and English translation).
CN Patent Appln. 200580049524.9 Third Office Action dated Mar. 20, 2012 (and English translation).
KR Patent Appln. 10-2007-7023842 First Office Action dated Apr. 18, 2012 (English translation only).
KR Patent Appln. 10-2007-7023842 Second Office Action dated Oct. 24, 2012 (English translation only).
KR Patent Appln. 10-2007-7024156 First Office Action dated Jul. 30, 2012 (English translation only).
KR Patent Appln. 10-2007-7024145 First Office Action dated Jan. 17, 2012 (English translation only).

(56) References Cited

OTHER PUBLICATIONS

KR Patent Appln. 10-2007-7024145 Second Office Action dated Sep. 23, 2012 (English translation only).
Nikkei Electronics, "Contents Transcoding Technology is Now Spotlighted as 'Lubricant' for Online Digital Distribution", Jul. 31, 2000.
KR Notice of Final Rejection for Application No. 10-2007-7020527, Reference 308715.08, Oct. 30, 2012.
EP Communication for Application No. 06 738 895.9-2202, Reference FB19160, Jan. 8, 2013.
CN Notice on the Second Office Action for Application No. 200680012462.9, Aug. 10, 2010.
EP Communication for Application No. 04 778 899.7-2212, Reference EP35523RK900peu, Nov. 23, 2012.
PCT International Search Report and Written Opinion for Application No. PCT/US2006/09904, Reference 308715.02, Jul. 11, 2008.
CN First Office Action for Application No. 200680012462.9, Mar. 10, 2010.
JP Notice of Rejection for Application No. 2008-507668, Sep. 2, 2011.
EP Communication for Application No. 06738895.9-2202/1872479 PCT/US2006/009904, Reference FB19160, Sep. 16, 2011.
KR Office Action for Application No. 10-2007-7020527, Reference 308715.08, Apr. 9, 2012.
JP Final Rejection for Application No. 2008-507668, May 18, 2012.
Kassler, "Generic QOS Aware Media Stream Transcoding and Adaptation", Department of Distributed Systems, Apr. 2003.
DRM Watch Staff, "Microsoft Extends Windows Media DRM to Non-Windows Devices", May 7, 2004.
Lee, "Gamma: A Content-Adaptation Server for Wireless Multimedia Applications", Bell Laboratories, 2003.
IHDE, "Intermediary-Based Transcoding Framework", Jan. 2001.
Lightsurf, "LightSurf Intelligent Media Optimization and Transcoding", Printed Apr. 18, 2005.
Digital 5, "Media Server", Printed Apr. 18, 2005.
"Transcode", Nov. 29, 2002.
"SoX—Sound eXchange", Mar. 26, 2003.
Britton, "Transcoding: Extending E-Business to New Environments", IBM Systems Journal, 2001.
Chandra, "Application-Level Differentiated Multimedia Web Services Using Quality Aware Transcoding", IEEE Journal on Selected Areas of Communications, Dec. 2000.
Chen, "An Adaptive Web Content Delivery System", May 21, 2000.
Chen, "iMobile EE—An Enterprise Mobile Service Platform", AT&T Labs, 2003.
Chi, "Pervasive Web Content Delivery with Efficient Data Reuse", Aug. 1, 2002.
Ripps, "The Multitasking Mindset Meets the Operating System", Electrical Design News, Oct. 1, 1990.
Huang, "A Frame-Based MPEG Characteristics Extraction Tool and Its Application in Video Transcoding", IEEE Transaction on Consumer Electronics, Aug. 2002.
Lee, "Data Synchronization Protocol in Mobile Computing Environment Using SyncML", Proceedings of the 5th IEEE International Conference on High Speed Networks and Multimedia Communication, 2002.
Shaha, "Multimedia Content Adaptation for QoS Management Over Heterogeneous Networks", May 11, 2001.
Shen, "Caching Strategies in Transcoding-Enabled Proxy Systems for Streaming Media Distribution Networks", Dec. 10, 2003.
Singh, "PTC: Proxies the Transcode and Cache in Heterogeneous Web Client Environments", Proceedings of the 3rd International Conference on Web Information Systems, 2002.
Lei, "Context-Based Media Adaptation in Pervasive Computing", May 31, 2001.
PCT Preliminary Report and Patentability for Application No. PCT/US2006/010664, Reference 313744.02, Nov. 22, 2007.
CN First Office Action for Application No. 200580049553.5, Aug. 8, 2008.

CN the Second Office Action for Application No. 200680013409.0, Feb. 12, 2010.
CN Notice on the First Office Action for Application No. 200810189718.4, Jun. 2, 2010.
CN Notice on the First Office Action for Application No. 200810189719.9, Jul. 30, 2010.
EP Partial Search Report for Application No. 06774630.5-1243/ 1902367 PCT/US2006/026915, Reference FB19620, Mar. 29, 2012.
KR Notice of Final Rejection for Application No. 10-2007-7024145, Reference 313361.12, Oct. 23, 2012.
KR Notice of Final Rejection for Application No. 10-2007-7023842, Reference 313361.06, Oct. 24, 2012.
Hong, "On the Construction of a Powerful Distributed Authentication Server Without Additional Key Management", Nov. 1, 2000.
"Managing Digital Rights in Online Publishing: How Two Publishing Houses Maintain Control of Copyright", Information Management and Technology, Jul. 2001.
Jakobsson, "Proprietary Certificates", 2002.
Kumik, "Digital Rights Management", Computers and Law, E-Commerce: Technology, Oct. 2000.
Torrubia, "Cryptography Regulations for E-Commerce and Digital Rights Management", Computers and Security, 2001.
Zwollo, "Digital Document Delivery and Digital Rights Management", 2001.
Kahn, "Deposit, Registration and Recordation in an Electronic Copyright Management System", Jul. 3, 2002.
Evans, "DRM: Is the Road to Adoption Fraught with Potholes?", 2001.
Fowler, "Technology's Changing Role in Intellectual Property Rights", IT Pro, Mar. 2002.
Gable, "The Digital Rights Conundrum", Transform Magazine, Nov. 2001.
Gunter, "Models and Languages for Digital Rights", Proceedings of the 34th Hawaii International Conference on System Sciences, Jan. 3-6, 2001.
Peinado, "Digital Rights Management in a Multimedia Environment", SMPTE Journal, Apr. 2002.
Royan, "Content Creation and Rights Management: Experiences of SCRAN (The Scottish Cultural Resources Access Network)", 2000.
Valimaki, "Digital Rights Management on Open and Semi-Open Networks", Proceedings of the 2nd IEEE Workshop on Internet Applications, Jul. 23-24, 2001.
Yu, "Digital Multimedia at Home and Content Rights Management", Proceedings of the 4th IEEE International Workshop on Networked Appliances, Jan. 15-16, 2002.
Hwang, "Protection of Digital Contents on Distributed Multimedia Environment", Proceedings of the IASTED International Conference on Internet and Multimedia Systems and Applications, Nov. 19-23, 2000.
Castro, "Secure Routing for Structured Peer-To-Peer Overlay Networks", Proceedings of the 5th Symposium on Operating Systems Design and Implementation, Dec. 9-11, 2002.
Friend, "Making the Gigabit IPsec VPN Architecture Secure", Jun. 2004.
Hulicki, "Security Aspects in Content Delivery Networks", Proceedings of the 6th World Multiconference on Systemics, Cybernetics and Informatics, Jul. 14-18, 2002.
Mcgarvey, "Arbortext: Enabler of Multichannel Publishing", Apr. 2002.
Moffett, "Contributing and Enabling Technologies for Knowledge Management", International Journal of Information Technology and Management, Jul. 2003.
JP Notice of Rejection for Application No. 2009-288223, Jun. 29, 2012.
EP Communication for Application No. 11007532.2-1247/2492774, Reference EP27518ITEjan, Aug. 3, 2012.
Utagawa, "Making of Card Applications Using IC Card OS 'MULTOS'", Mar. 1, 2003.
Nakajima, "Do You Really Know It? Basics of Windows 2000/XP", Jan. 2004.
"First Special Feature, Security Oriented Web Application Development; Part 3: Method for Realizing Secure Session Management", N+1 Network Guide, Jan. 2004.

(56) References Cited

OTHER PUBLICATIONS

PCT International Search Report and Written Opinion for Application No. PCT/US06/27251, Reference 311888.02, Jul. 3, 2007.
CN First Office Action for Application No. 200680026251.0, Oct. 8, 2010.
CN Third Office Action for Application No. 03145223.X, Mar. 7, 2008.
EP Communication for Application No. 03 011 235.3-1247, Reference EP27518-034/gi, Apr. 22, 2010.
EP Communication for Application No. 03 011 235.3-1247, Reference EP27518-034/gi, Nov. 4, 2011.
JP Notice of Rejection for Application No. 2003-180214, Sep. 18, 2009.
RU Official Action for Application No. 2003118755/09 (020028), Reference 2412-127847RU/3152, Jul. 3, 2007.
CN Notice on the First Office Action for Application No. 200510056328.6, Jul. 24, 2009.
EP Communication for Application No. 05 101 873.7-1247, Reference EP34127TE900kja, Dec. 19, 2006.
JP Notice of Rejection for Application No. 2005-067120, Dec. 28, 2010.
Bellovin, "Defending Against Sequence No. Attacks", May 1996.
Kim, "Development of WDM Integrated Optical Protection Socket Module", Journal of the Korean Institute of Telematics and Electronics, Mar. 1996.
Gardan, "N+P (With and Without Priority) and Virtual Channel Protection: Comparison of Availability and Application to an Optical Transport Network", Proceedings of the 7th International Conference on Reliability and Maintainability, Jun. 18, 1990.
Microsoft, "Digital Rights Management for Audio Drivers", Dec. 4, 2001.
Microsoft, "Hardware Platform for the Next-Generation Secure Computing Base", Windows Platform Design Notes, 2003.
Microsoft, "Security Model for the Next-Generation Secure Computing Base", Windows Platform Design Notes, 2003.
CN First Office Action for Application No. 200480012375.4, Sep. 4, 2009.
CN Second Office Action for Application No. 200480012375.4, Feb. 12, 2010.
AU Examiner's First Report on Application No. 2004288600, Jan. 18, 2010.
RU Office Action for Application No. 2005120671, Reference 2412-132263RU/4102, Aug. 15, 2008.
PCT International Search Report and Written Opinion for Application No. PCT/US04/23606, Apr. 27, 2005.
EP Communication for Application No. 04 779 544.8-2212/1678570 PCT/US2004024529, Reference EP35527RK900kja, Mar. 9, 2010.
EP Communication for Application No. 04 779 544.8-2212, Reference EP35527RK900kja, May 10, 2010.
EP Summons to Attend Oral Proceedings for Application No. 04 779 544.8-2212/1678570, Reference EP35527RK900kja, May 10, 2012.
Bovet, "An Overview of Unix Kernels", 2001.
JP Notice of Rejection for Application No. 2006-536592, Nov. 19, 2010.
CN First Office Action for Application No. 200480003262.8, Nov. 30, 2007.
CN Second Office Action for Application No. 200480003262.8, Jun. 13, 2008.
CA Office Action for Application No. 2,511,397, Mar. 22, 2012.
PCT International Search Report and Written Opinion for Application No. PCT/US04/24529, Reference MSFT-4429, May 12, 2006.
JP Notice of Rejection for Application No. 2006-536586, Nov. 12, 2010.
EP Communication for Application No. 04 779 478.9-2212, Reference EP35512RK900peu, May 21, 2010.
EP Communication for Application No. 04 779 478.9-2212, Reference EP35512RK900peu, Apr. 3, 2012.

AU Examiner's First Report on Application No. 2004287141, Dec. 8, 2008.
PCT International Search Report and Written Opinion for Application No. PCT/US04/24433, Reference MSFT-4430, Nov. 29, 2005.
CN First Office Action for Application No. 200480003286.3, Nov. 27, 2009.
CA Office Action for Application No. 2,511,531, Mar. 22, 2012.
CN First Office Action for Application No. 200680013409.0, Jun. 26, 2009.
CN First Office Action for Application No. 200680013372.1, Dec. 18, 2009.
Abbadi, "Digital Rights Management Using a Mobile Phone", Proceedings of the 9th International Conference on Electronic Commerce, Aug. 19-22, 2007.
RU Office Action for Application No. 2005120671, Reference 2412-132263RU/4102, Oct. 21, 2008.
CN The First Office Action for Application No. 200580049524.9, Mar. 8, 2010.
MY Office Action for Application No. PI 20053786, Reference CPK.695654.YO.CJ, Feb. 15, 2012.
TW Search Report for Application No. 094130187, Jul. 27, 2012.
International Search Report and Written Opinion mailed Jan. 16, 2007, Application No. PCT/US2006/034622, 6 pages.
International Search Report and Written Opinion mailed Nov. 30, 2006, Application No. PCT/US05/40950, 8 pages.
Qiao, Daji et al., "MiSer: An Optimal Low-Energy Transmission Strategy for IEEE 802.11 a/h", *obtained from ACM*, (Sep. 2003), pp. 161-175.
International Search Report and Written Opinion mailed Apr. 22, 2008, Application No. PCT/US2007/087960, 7 pages.
Eren, H. et al., "Fringe-Effect Capacitive Proximity Sensors for Tamper Proof Enclosures", *Proceedings of 2005 Sensors for Industry Conference*, (Feb. 2005) pp. 22-25.
International Search Report and Written Opinion mailed Jul. 24, 2008, Application No. PCT/US05/40966, 13 pages.
Goering, Richard "Web Venture Offers Metered Access to EDA Packages—Startup Winds Clocks By the Hour Tools (E*CAD Will Launch Web Site That Provides Pay-Per-Use and Pay-Per-Hour Access to Range of Chip Design Software)", *Electronic Engineering Times*, (Nov. 6, 2000), 3 pages.
Zemao, Chen et al., "A Malicious Code Immune Model Based on Program Encryption", *IEEE—Wireless Communication, Networking and Mobile Computing*, WICOM '08, 4th International Conference on Oct. 12-14, 2008, (2008), 5 pages.
Mufti, Dr. Muid et al., "Design and Implementation of a Secure Mobile IP Protocol", *Networking and Communication, INCC 204*, International Conference on Jun. 11-13, 2004, (2004), 5 pages.
Davida, George I., et al., "UNIX GUARDIANS: Active User Intervention in Data Protection", *Aerospace Computer Security Applications Conference, Fourth* Dec. 12-16, 1988, 6 pages.
Morales, Tatiana "Understanding Your Credit Score", http:www.cbsnews.com/stories/2003/04/29/earlyshow/contributors/raymartin/main55152.shtml retrieved from the Internet on Apr. 23, 2009, (Apr. 30, 2003), 3 pages.
"Achieving Peak Performance: insights from a Global Survey on Credit Risk and Collections Practices", *GCI Group Pamphlet*, (2002, 2004), 12 pages.
"Equifax Business Solutions—Manage Your Customers", Retrieved from the Internet from http://www.equifax.com/sitePages/biz/smallBiz/!sitePage=manage Customers on Oct. 14, 2005, 3 pages.
"Prequalification Using Credit Reports", Retrieved from the Internet at http://www.credco.com/creditreports/prequalification.htm on Oct. 14, 2005, 2 pages.
Gao, Jerry et al., "Online Advertising—Taxonomy and Engineering Perspectives", http://www.engr.sisu.edu/gaojerry/report/OnlineAdvertising%20.pdf, (2002) 33 pages.
Oshiba, Takashi et al., "Personalized Advertisement-Duration Control for", *ACM Multimedia*, (2002), 8 pages.
Yue, Wei T., et al., "The Reward Based Online Shopping Community", Routledge, vol. 10, No. 4, (Oct. 1, 2000), 2 pages.
International Search Repory and Written Opinion mailed Nov. 8, 2007, Application No. PCT/US05/40967, 5 pages.

(56) References Cited

OTHER PUBLICATIONS

International Search Report and Written Opinion, Application Serial No. PCT/US05/40940, 9 pages May 2, 2008.
International Search Report and Written Opinion mailed Apr. 25, 2007, Application No. PCT/US05/040965, 5 pages.
International Search Report and Written Opinion mailed Sep. 25, 2006, Application No. PCT/US05/40949, 7 pages.
EP Office Action Mailed Nov. 17, 2006, Application No. 05110697.9, 6 pages.
EP Office Action mailed Apr. 5, 2007, Application No. 05110697.9, 5 pages.
EP Summons to Attend Oral Proceedings mailed Sep. 27, 2007, Application No. 05110697.9, 7 pages.
Decision to Refuse a European Application mailed Feb. 15, 2008, Application No. 05110697.9, 45 pages.
International Search Report and Written Opinion mailed Sep. 8, 2006, Application No. PCT/US05/040942, 20 pages.
European Search Report mailed Dec. 6, 2010, Application No. 05820177.3, 8 pages.
Lampson, Butler et al., "Authentication in Distributed System: Theory and Practice", *ACM Transactions on Computer Systems*, v10, 265, (1992), 18 pages.
Office Action mailed Jun. 29, 2009, Mexican Application No. MX/a/2007/005657, 2 pages.
Search Report Dated Jan. 11, 2008, EP Application No. 05820090.8, 7 pages.
Examination Report mailed Mar. 5, 2008, EP Application No. 05820090.8, 1 page.
First Office Action Mailed Apr. 11, 2008, Chinese Application No. 200580038813.9, 11 pages.
Office Action mailed Jun. 29, 2009, Mexican Application No. MX/a/2007/005656, 6 pages.
Office Action mailed Nov. 30, 2009, Mexican Application No. MX/a/2007/005659, 6 pages.
Notice of Allowance mailed Jul. 2, 2010, Mexican Application No. MX/a/2007/005659, 2 pages.
Extended European Search Report mailed Dec. 6, 2010, EP Application No. 05820177.3, 8 pages.
Second Office Action mailed Dec. 18, 2009, Chinese Application No. 200580038812.4, 24 pages.
Third Office Action mailed Apr. 1, 2010, Chinese Application No. 200580038812.4, 9 pages.
Notice on Grant of Patent Right for Invention mailed May 5, 2011, Chinese Application No. 200580038812.4, 4 pages.
Office Action mailed Jul. 7, 2009, Mexican Application No. MX/a/2007/005660, 8 pages.
Notice of Allowance mailed Feb. 18, 2010, Mexican Application No. MX/a/2007/005660, 2 pages.
Extended European Search Report mailed Aug. 13, 2010, EP Application No. 05823253.9, 7 pages.
Notice on the First Office Action mailed Sep. 27, 2010, Chinese Application No. 200580038745.6, 6 pages.
Office Action mailed Jul. 8, 2009, Mexican Application No. MX/a/2007/005662, 7 pages.
Notice of Allowance mailed Feb. 19, 2010, Mexican Application No. MX/a/2007/005662, 2 pages.
Partial Search Report mailed Jul. 23, 2010, EP Application No. 05821183.0.
Extended European Search Report mailed Jan. 7, 2011, EP Application No. 05821183.0, 9 pages.
Notice of Allowance mailed Dec. 25, 2009, Chinese Application No. 200580038773.8, 4 pages.
Office Action mailed Jun. 26, 2009, Mexican Application No. MX/a/2007/005655, 5 pages.
Office Action mailed Feb. 9, 2010, Mexican Application No. MX/a/2007/005855, 6 pages.
Office Action mailed Sep. 24, 2010, Mexican Application No. MX/a/2007/005655, 3 pages.
Extended European Search Report mailed Jan. 21, 2010, EP Application No. 05819896.1, 8 pages.
Office Action Mailed Mar. 19, 2010, EP Application No. 05819896.1, 1 page.
Office Action mailed Feb. 10, 2010, Mexican Application No. MX/a/2007/005656, 5 pages.
Office Action mailed Oct. 18, 2010, Mexican Application No. MX/a/2007/005656, 3 pages.
Notice on the First Office Action mailed Jul. 30, 2010, Chinese Application No. 200680033207.2, 7 pages.
EP Search Report mailed Jan. 2, 2008, EP Application No. 05109616.2, 7 pages.
Flonix: USB Desktop OS Solutions Provider, http://www.flonix.com, Retrieved from the Internet Jun. 1, 2005, (Copyright 2004), 2 pages.
Migo by PowerHouse Technologies Group, http://www.4migo.com, Retrieved from the Internet Jun. 1, 2005, (Copyright 2003), 3 pages.
WebServUSB, http://www.webservusb.com, Retrieved from the Internet Jun. 1, 2005, (Copyright 2004), 16 pages.
Notice of Rejection mailed Jul. 8, 2011, Japanese Application No. 2007-541363, 10 pages.
Notice of Rejection mailed Aug. 5, 2011, Japanese Patent Application No. 2007-552142, 8 pages.
"Forward Solutions Unveils industry's Most Advanced Portable Personal Computing System on USB Flash Memory Device", *Proquest, PR Newswire*, http://proquest.umi.com/pqdweb?index=20&did=408811931&SrchMode=1&sid=6&Fmt=3, Retreived from the Internet Feb. 15, 2008, (Sep. 22, 2003), 3 pages.
Office Action mailed May 26, 2008, EP Application No. 05109616.2, 5 pages.
Notice on Division of Application mailed Aug. 8, 2008, CN Application No. 200510113398.0, (Aug. 8, 2008), 2 pages.
Notice on First Office Action mailed Dec. 12, 2008, CN Application No. 200510113398.0.
The Second Office Action mailed Jul. 3, 2009, CN Application No. 200510113398.0, 7 pages.
Notice on Proceeding with the Registration Formalities mailed Oct. 23, 2009, CN Application No. 200510113398.0, 4 pages.
Examiner's First Report on Application mailed Jun. 4, 2010, AU Application No. 2005222507, 2 pages.
Notice of Acceptance mailed Oct. 14, 2010, AU Application No. 2005222507, 3 pages.
Decision on Grant of a Patent for Invention mailed Apr. 29, 2010, Russian Application No. 2005131911, 31 pages.
Notice of Allowance mailed Nov. 13, 2009, Mexican Application No. PA/a/2005/011088, 2 pages.
"TCG Specification Architecture Overview", Revision 1.2, (Apr. 28, 2004), 55 pages.
International Search Report and Written Opinion mailed Jun. 19, 2007, PCT Application No. PCT/US05/46091, 11 pages.
Notice on Grant of Patent Right for Invention mailed Jan. 29, 2010, CN Application No. 200580040764.2, 4 pages.
International Search Report mailed Jan. 5, 2007, Application No. PCT/US2006/032708, 3 pages.
Cyotec—CyoLicence, printed from www.cyotec.com/products/cyoicence on Sep. 7, 2005, (Copyright 2003-2005).
"Magic Desktop Automation Suite for the Small and Mid-Sized Business", printed from www.remedy.com/solutions/magic_it_suite.htm on Sep. 7, 2005, (Copyright 2005), 4 pages.
"PACE Anti-Piracy Introduction", printed from www.paceap.com/psintro.html on Sep. 7, 2005, (Copyright 2002), 4 pages.
Office Action mailed Jul. 6, 2009, MX Application No. MX/a/2007/005661, 6 pages.
Office Action mailed Oct. 1, 2010, MX Application No. MX/a/2007/005661, 3 pages.
Office Action mailed Mar. 8, 2011, MX Application No. MX/a/2007/005661, 8 pages.
Notice on Second Office Action mailed Jun. 7, 2010, CN Application No. 200680030846.3, 6 pages.
Decision on Rejection mailed Sep. 13, 2010, CN Application No. 200680030846.3, 5 pages.
Kwok, Sai H., "Digital Rights Management for the Onlinw Music Business", *ACM SIGecom Exhchanges*, vol. 3, No. 3, (Aug. 2002), pp. 17-24.

(56) References Cited

OTHER PUBLICATIONS

International Search Report and Written Opinion mailed Mar. 21, 2007, Application No. PCT/US05/46223, 10 pages.
The First Office Action mailed Oct. 9, 2009, CN Application No. 200580043102.0, 20 pages.
International Search Report and Written Opinion mailed Jul. 9, 2008, Application No. PCT/US05/46539, 11 pages.
Notice of the First Office Action mailed Dec. 29, 2010, CN Application No. 200580044294.7, 9 pages.
Office Action mailed Jul. 1, 2009, MX Application No. 2007/a/2007/007441.
European Search Report mailed Aug. 31, 2011, EP Application No. 05855148.2, 6 pages.
International Search Report and Written Opinion mailed Sep. 25, 2007, Application No. PCT/US06/12811, 10 pages.
Examiner's First Report mailed Sep. 15, 2009, AU Application No. 2006220489, 2 pages.
Notice of Acceptance mailed Jan. 25, 2010, AU Application No. 2006220489, 2 pages.
The First Office Action mailed Aug. 22, 2008, CN Application No. 200680006199.2, 23 pages.
The Second Office Action mailed Feb. 20, 2009, CN Application No. 200680006199.2, 9 pages.
The Fourth Office Action mailed Jan. 8, 2010, CN Application No. 200680006199.2, 10 pages.
The Fifth Office Action mailed Jul. 14, 2010, CN Application No. 200680006199.2, 6 pages.
Notice on Grant of Patent mailed Oct. 20, 2010, CN Application No. 20068006199.2, 4 pages.
First Office Action mailed Aug. 21, 2009, CN Application No. 200680030846.3, 8 pages.
Notice on the First Office Action mailed Dec. 11, 2009, CN Application No. 200510127170.7, 16 pages.
The Third Office Action mailed Jun. 5, 2009, CN Application No. 200680006199.2, 7 pages.
Notice of Rejection mailed Sep. 9, 2011, JP Application No. 2007-548385, 9 pages.
Notice of Rejection mailed Nov. 11, 2011, Japanese Application No. 2005-301957, 21 pages.
Extended European Search Report mailed Dec. 21, 2011, EP Application No. 05854752.2, 7 pages.
Final Rejection mailed Jan. 17, 2012, Japan Application No. 2007-552142, 8 pages.
EP Office Action mailed Mar. 8, 2012, EP Application No. 05109616.2, 6 pages.
Notice of Preliminary Rejection mailed May 30, 2012, Korean Patent Application No. 10-2007-7011069, 1 page.
Extended European Search Report mailed Jul. 5, 2012, EP Application No. 05851550.3, 6 pages.
Preliminary Rejection mailed Jul. 4, 2012, Korean Application No. 10-2007-7012294, 2 pages.
Office Action mailed Jun. 8, 2012, JP Application No. 2005-301957, 8 pages.
EP Communication for Application No. 04779478.9-2212/1620780 PCT/US2004024433, Reference EP35512RK900peu, Mar. 10, 2010.
Wenz, "Ohren Auf Den Schienen", Magazin Fuer Computer Technik, Mar. 10, 2003.
EP Decision to Refuse for Application No. 04 779 544.8-2212, Reference EP35527RK900kja, Nov. 27, 2012.
JP Notice of Rejection for Application No. 2006-536592, Jul. 29, 2011.
KR Notice of Preliminary Rejection for Application No. 10-2005-7012442, Jan. 13, 2011.
IN First Examination Report for Application No. 2737/DELNP/2005, Mar. 20, 2013.
CA Office Action for Application No. 2,511,397, May 9, 2013.
AU Examiner's First Report for Application No. 2004287144, Reference 1268660/DBW, Sep. 17, 2009.
JP Notice of Rejection for Application No. 2006-536586, May 31, 2011.
IN First Examination Report for Application No. 2673/DELNP/2005, Oct. 19, 2013.
CN Notice on the First Office Action for Application No. 200510056328.6, Mar. 2, 2010.
CN Notice on the First Office Action for Application No. 201010192452.6, Dec. 9, 2010.
CN Notice on the Second Office Action for Application No. 201010192452.6, Oct. 26, 2011.
CN Notice on the Third Office Action for Application No. 201010192452.6, Jun. 1, 2012.
CN Notice on the Fourth Office Action for Application No. 201010192452.6, Dec. 4, 2012.
EP Communication for Application No. 05101873.7-2212, Reference EP34127TE900kja, Nov. 22, 2005.
EP Communication for Application No. 05101873.7-2224, Reference EP34127TE900kja, Mar. 31, 2006.
JP Notice of Rejection for Application No. 2005-067120, Apr. 28, 2011.
MY Search Report for Application No. PI 20031863, Dec. 24, 2007.
AU Examiner's First Report for Application No. 2003204380, Aug. 17, 2007.
EP Communication for Application No. 03011235.3-2212, Reference EP27518-034/gi, Dec. 2, 2003.
CN The Second Office Action for Application No. 033145223.X, Oct. 19, 2007.
KR Notice of Preliminary Rejection for Application No. 10-2003-39336, Jan. 31, 2011.
KR Notice of Preliminary Rejection for Application No. 10-2003-39336, Jun. 29, 2010.
MX Office Action for Application No. PA/a/2003/004890, May 9, 2008.
IN Examination Report for Application No. 509/MUM/2003, Received on Aug. 19, 2009.
IN First Examination Report for Application No. 509/MUM/2003, Sep. 15, 2008.
PO Office Action for Application No. P 360755, Oct. 23, 2009.
AU Examiner's Report for Application No. 2008203013, Nov. 11, 2009.
CA Office Action for Application No. 2,771,057, Mar. 18, 2013.
CA Office Action for Application No. 2,771,080, Sep. 24, 2012.
CA Office Action for Application No. 2,771,038, Sep. 24, 2012.
U.S. Appl. No. 11/116,598, filed Apr. 27, 2005.
U.S. Appl. No. 12/390,505, filed Feb. 23, 2009.
U.S. Appl. No. 11/116,689, filed Apr. 27, 2005.
U.S. Appl. No. 60/673,979, filed Apr. 22, 2005.
U.S. Appl. No. 11/202,840, filed Aug. 12, 2005.
U.S. Appl. No. 11/202,838, filed Aug. 12, 2005.
U.S. Appl. No. 11/191,448, filed Jul. 28, 2005.
U.S. Appl. No. 09/525,510, filed Mar. 15, 2000.
U.S. Appl. No. 11/866,041, filed Oct. 2, 2007.
U.S. Appl. No. 10/178,256, filed Jun. 24, 2002.
U.S. Appl. No. 11/275,991, filed Feb. 8, 2006.
U.S. Appl. No. 11/275,990, filed Feb. 8, 2006.
U.S. Appl. No. 11/275,993, filed Feb. 8, 2006.
U.S. Appl. No. 11/938,707, filed Nov. 12, 2007.
U.S. Appl. No. 60/513,831, filed Oct. 23, 2003.
U.S. Appl. No. 10/820,673, filed Apr. 8, 2004.
U.S. Appl. No. 11/870,837, filed Oct. 11, 2007.
U.S. Appl. No. 10/820,666, filed Apr. 8, 2004.
U.S. Appl. No. 10/838,532, filed May 3, 2004.
U.S. Appl. No. 10/798,688, filed Sep. 15, 2005.
U.S. Appl. No. 12/715,529, filed Mar. 2, 2010.
U.S. Appl. No. 10/835,951, filed Apr. 30, 2004.
U.S. Appl. No. 10/968,462, filed Oct. 18, 2004.
U.S. Appl. No. 13/367,198, filed Feb. 6, 2012.
U.S. Appl. No. 11/018,095, filed Dec. 20, 2004.
U.S. Appl. No. 11/108,327, filed Apr. 18, 2005.
U.S. Appl. No. 11/184,555, filed Jul. 19, 2005.
U.S. Appl. No. 11/129,872, filed May 16, 2005.
U.S. Appl. No. 60/698,525, filed Jul. 11, 2005.
U.S. Appl. No. 11/276,496, filed Mar. 2, 2006.

(56) References Cited

OTHER PUBLICATIONS

U.S. Appl. No. 11/179,013, filed Jul. 11, 2005.
U.S. Appl. No. 13/016,686, filed Jan. 28, 2011.
JP Notice of Rejection for Application No. 2007-541361, Jun. 7, 2011.
"Black Box Crypton Defies the Hackers", Electronics Weekly, Mar. 6, 1983.
"Aladdin Acquires the Assets of Micro Macro Technologies", Mar. 3, 1999.
JP Notice of Rejection for Application No. 2007-551270, Jun. 13, 2011.
"Breaker Tech Joins Copyright Management Market", Aug. 5, 1999.
JP Notice of Rejection for Application No. 2005-330496, Jun. 21, 2011.
"Optimising License Checkouts from a Floating License Server", Published on or Before Dec. 20, 2003.
Blissmer, "Next Step is Encryption: Data Security May Be Bundled With Next's Operating System", Electronic Engineering Times, Feb. 3, 1992.
Stevens, "How Secure is Your Computer System?", Practical Accountant, Jan. 1998.
JP Office Action for Application No. 2008-528054, Dec. 7, 2011.
Olson, "Concurrent Access Licensing", UNIX Review, Sep. 1988.
"Sony Develops Copyright Protection Solutions for Digital Music Content", PR Newswire, Feb. 25, 1999.
"Solution for Piracy", Nov. 1983.
"Finland—Data Fellows Secures ICSA Certification", Newsbytes, Jan. 7, 1998.
Thompson, "Digital Licensing" IEEE Internet Computing, Jul. 2005.
Dataquest, "The Key to Keys", Aug. 31, 1997.
Malamud, "Network-Based Authentication: The Key to Security", Network Computing, Jun. 1991.
Kopeikin, "Secure Trading on the Net", Oct. 1996.
"The New Network: Planning and Protecting Internet Electronic Commerce", Information Week, Feb. 12, 1996.
Chin, "Reaching Out to Physicians", Health Data Management, Sep. 1998.
Finnie, "Suppliers Cashing In on the Internet", Communications Week International, Nov. 14, 1994.
"Postal Service Announce Plan to Postmarks on Electronic Mail", San Jose Mercury News, Apr. 9, 1995.
Dawson, "S-A Unveil Security System", Jan. 15, 1996.
"Bankard Set to Into Virtual Shopping in Philippines", Newsbytes News Network, Apr. 16, 1997.
Rouvroy, "Recon Figurable Hardware Solution for the Digital Rights Managements of Digital Cinema", Proceedings of the 4th ACM Workshop in Digital Rights Management, Oct. 25-29, 2004.
Housley, "Internet X. 509 Public Key Infrastructure Certificate and Certificate Renovation List Profile", Apr. 2002.
Housley, "Metering: A Pre-Pay Technique", Proceedings of the SPIE—The International Society for Optical Engineering, 1997.
Ogata, "Provably Secure Metering Scheme", Proceedings of the 6th International Conference on the Theory and Application of Cryptology and Information Security, 2000.
Seok, "A Secure and Efficient Metering Scheme for Internet Advertising", Journal of KISS: Computer Systems and Theory, 2002.
Stallings, "Network and Internetwork Security Principles and Practice", 1995.
Linn, "Privacy Enhancement for Internet Email—Part 1: Message Encryption and Authentication Procedures", Feb. 1993.
Kaliski, "Privacy Enhancement for Internet Email—Part 4: Key Certification and Related Services", Feb. 1993.
Backman, "Smartcards: The Intelligent Way to Security", Network Computing, May 15, 1998.
"Free On-Line Dictionary of Computing Concatenate", Dec. 22, 1995.
Hanai, "Latest Information and Establishment of a Server-Setting Up Free BSD-UNIX USER", Mar. 1, 2002.
Oda, "The Basics and Application of Security ID Cards Passport to and E-Business", Apr. 27, 2000.
"How to Prevent Copying DB Application to Other Machines", Dec. 22, 1998.
JP Final Office Action for Application No. 2000-608539, Oct. 22, 2009.
JP Office Action for Application No. 2000-608242, Jun. 30, 2010.
"Internet Dynamics First to Ship Integrated Security Solution for Enterprise Intranets and Extranets", Business Wire, Sep. 15, 1997.
Cylink, "Public-Key Security Technology Granted to the Public", Nov. 16, 1997.
MX Office Action for Application No. PA/a/2005/007150, Reference 306929.11, Jun. 3, 2009.
EP Communication for Application No. 04778899.7-2212/1743446 PCT/US2004023606, Reference EP35523RK900peu, Jul. 4, 2012.
EP Communication for Application No. 04778899.7-2212, Reference EP35523RK900peu, Jan. 31, 2012.
CA Office Action for Application No. 2,612,631, Apr. 8, 2013.
CN Notice on the Second Office Action for Application No. 200680026251.0, Apr. 20, 2011.
KR The Notice of Preliminary Rejection for Application No. 10-2007-7030758, Reference 311888.09, Jul. 27, 2012.
Amin, "Resolving Partial Media Topologies", U.S. Appl. No. 10/796,505, filed Mar. 8, 2004.
"DirectShow System Overview", Accessed on Nov. 9, 2005.
"Features of the VMR", Accessed on Nov. 9, 2005.
"Introduction to DirectShow Application Programming", Accessed on Nov. 9, 2005.
"Overview of Data Flow in DirectShow", Accessed on Nov. 9, 2005.
"Plug-in Distributors", Accessed on Nov. 9, 2005.
Linetsky, "Programming Microsoft DirectShow", Oct. 15, 2002.
Pesce, "Programming Microsoft DirectShow for Digital Video and Television", Feb. 12, 2003.
"Using the Video Mixing Renderer", Accessed on Nov. 9, 2005.
"VMR Filter Components", Accessed on Nov. 9, 2005.
MY Response to Office Action, From Malaysian Patent Application No. PI 20053786, Filed May 17, 2012.
CN Response to First Office Action, From Chinese Patent Application No. 200580049524.9, Filed Jul. 5, 2010.
CN Response to Second Office Action, From Chinese Patent Application No. 200580049524.9, Filed Aug. 29, 2011.
CN Response to Third Office Action, From Chinese Patent Application No. 200580049524.9, Filed Jun. 1, 2012.
KR Response to Office Action, From Korean Patent Application No. 10-2007-7023842, Filed Jun. 15, 2012.
KR Response to Office Action, From Korean Patent Application No. 10-2007-7023842, Filed Dec. 2012.
CN Response to First Office Action, From Chinese Patent Application No. 200680013409.0, Filed Oct. 26, 2009.
CN Response to Second Office Action, From Chinese Patent Application No. 200680013409.0, Filed Apr. 13, 2010.
KR Response to Office Action, From Korean Patent Application No. 10-2007-7024156, Filed Sep. 27, 2012.
CN Response to First Office Action, From Chinese Patent Application No. 200680013372.1, Filed Apr. 22, 2010.
CN Response to First Office Action, From Chinese Patent Application No. 200580049553.5, Filed Dec. 5, 2008.
CN Response to First Office Action, From Chinese Patent Application No. 200810189718.4, Filed Jun. 27, 2011.
CN Response to Second Office Action, From Chinese Patent Application No. 200810189719.9, Filed Jun. 17, 2011.
KR Response to Office Action, From Korean Patent Application No. 10-2007-7024145, Filed Mar. 19, 2012.
KR Response to Final Office Action, From Korean Patent Application No. 10-2007-7024145, Filed Nov. 23, 2012.
EP Response to Office Action, From European Patent Application No. 03011235.3, Filed Aug. 11, 2010.
EP Response to Office Action, From European Patent Application No. 03011235.3, Filed Feb. 3, 2012.
JP Response to Office Action, From Japanese Patent Application No. 2003-180214, Filed Dec. 18, 2009.

(56) References Cited

OTHER PUBLICATIONS

CA Response to Office Action, From Canadian Patent Application No. 2428953, Filed Jan. 25, 2012.
CA Response to Office Action, From Canadian Patent Application No. 2428953, Filed Mar. 5, 2012.
CA Response to Office Action, From Canadian Patent Application No. 2428953, Filed Jul. 23, 2012.
CA Response to Office Action, From Canadian Patent Application No. 2428953, Filed Oct. 15, 2012.
CA Response to Office Action, From Canadian Patent Application No. 2771038, Filed Oct. 23, 2012.
CA Response to Office Action, From Canadian Patent Application No. 2771057, Filed Apr. 30, 2013.
CA Response to Office Action, From Canadian Patent Application No. 2771080, Filed Dec. 12, 2012.
AU Response to Office Action, From Australian Patent Application No. 2003204380, Filed May 23, 2008.
AU Response to Office Action, From Australian Patent Application No. 2008203013, Filed Oct. 22, 2009.
AU Response to Second Office Action, From Australian Patent Application No. 2008203013, Filed Feb. 2, 2010.
CN Response to Third Office Action, From Chinese Patent Application No. 03145223.X, Filed May 7, 2008.
KR Response to Office Action, From Korean Patent Application No. 10-2003-0039336, Filed Aug. 31, 2010.
KR Response to Office Action, From Korean Patent Application No. 10-2003-0039336, Filed Apr. 1, 2011.
MX Response to Office Action, From Mexican Patent Application No. PA/a/2003/004890, Filed Aug. 28, 2008.
EP Response to Office Action, From European Patent Application No. 05101873.1-1247, Filed Mar. 6, 2007.
CN Response to First Office Action, From Chinese Patent Application No. 200510056328.6, Filed Dec. 11, 2009.
CN Response to Second Office Action, From Chinese Patent Application No. 200510056328.6, Filed May 16, 2010.
CN Response to First Office Action, From Chinese Patent Application No. 201010192452.6, Filed Dec. 11, 2009.
CN Response to Second Office Action, From Chinese Patent Application No. 201010192452.6, Filed Dec. 27, 2011.
CN Response to Third Office Action, From Chinese Patent Application No. 201010192452.6, Filed Jul. 2, 2012.
CN Response to Fourth Office Action, From Chinese Patent Application No. 201010192452.6, Filed Dec. 6 , 2012.
IN Response to Office Action, From Indian Patent Application No. 0448/DEL/2005, Filed Nov. 25 , 2014.
EP Response to Office Action, From European Patent Application No. 04778899.7, Filed Apr. 11, 2012.
EP Response to Office Action, From European Patent Application No. 04778899.7, Filed Mar. 26, 2013.
CN Response to First Office Action, From Chinese Patent Application No. 2000480012375.4, Filed Dec. 11, 2009.
CN Response to Second Office Action, From Chinese Patent Application No. 2000480012375.4, Filed Apr. 13, 2010.
EP Response to Office Action, From European Patent Application No. 04779544.8, Filed Aug. 19, 2010.
CN Response to First Office Action, From Chinese Patent Application No. 2000480003262.8, Filed Apr. 17, 2008.
CN Response to Second Office Action, From Chinese Patent Application No. 2000480003262.8, Filed Aug. 28, 2008.
KR Response to Office Action, From Korean Patent Application No. 10-2005-7012442, Filed Mar. 15, 2011.
IN Response to Office Action, From Indian Patent Application No. 02737/DELNP/2005, Filed May 6, 2013.
AU Response to Office Action, From Australian Patent Application No. 2004287144, Filed Jan. 5, 2010.
AU Response to Second Office Action, From Australian Patent Application No. 2004287144, Filed Mar. 30, 2010.
EP Response to Office Action, From European Patent Application No. 04779478.9. Filed Oct. 4, 2010.
EP Response to Office Action, From European Patent Application No. 04779478.9. Filed Jul. 17, 2012.
EP Response to Office Action, From European Patent Application No. 04779478.9. Filed Jul. 11, 2014.
CN Response to Office Action, From Chinese Patent Application No. 200480003286.3. Filed Mar. 23, 2010.
KR Response to Office Action, From Korean Patent Application No. 10-2005-7012206, Filed Mar. 15. 2011.
CA Response to Office Action, From Canadian Patent Application No. 2511531, Filed Jul. 10, 2012.
AU Response to Office Action, From Australian Patent Application No. 2004287141, Filed Aug. 13, 2009.
CN Response to Office Action, From Chinese Patent Application No. 200680025136.1. Filed Apr. 24, 2009.
CN Response to Second Office Action, From Chinese Patent Application No. 200680025136.1. Filed Jul. 1, 2011.
CN Response to Third Office Action, From Chinese Patent Application No. 200680025136.1. Filed Jan. 18, 2012.
EP Response to Office Action, From European Patent Application No. 06774630.5, Filed Oct. 26, 2012.
KR Response to Office Action, From Korean Patent Application No. 10-2008-7000503, Filed Nov. 27, 2012.
AU Response to Office Action, From Australian Patent Application No. 2006270273, Filed Mar. 17, 2010.
KR Response to Office Action, From Korean Patent Application No. 10-2007-7020527, Filed Nov. 27, 2012.
CA Response to Office Action, From Canadian Patent Application No. 2612631, Filed May 22, 2013.
CN Response to Office Action, From Chinese Patent Application No. 200680026251.0. Filed Dec. 27, 2010.
CN Response to Second Office Action, From Chinese Patent Application No. 200680026251.0. Filed Jun. 15, 2011.
EP Response to Office Action, From European Patent Application No. 06738895.9, Filed May 13, 2013.
KR Response to Office Action, From Korean Patent Application No. 10-2007-7030758, Filed Sep. 27, 2012.
IN Response to Office Action, From Indian Patent Application No. 04562/CHENP/2007, Filed Oct. 7, 2014.
CN Response to Office Action, From Chinese Patent Application No. 200680012462.9. Filed May 19, 2010.
CN Response to Second Office Action, From Chinese Patent Application No. 200680012462.9. Filed Sep. 15, 2010.
EP 06738895.9—Written Submission filed Mar. 6, 2014; 7 pages.
India Application No. 4562/CHENP/2007; Office Action Issued Mar. 26, 2014; 2 pages.
Canada Application No. 2771057; Notice of Allowance Mailed Nov. 26, 2013; 3 pages.
Taiwan Application No. 94130187; Notice of Allowance Mailed Nov. 15, 2013; 6 pages.
India Application No. 2673/DELNP/2005; Office Action Mailed Oct. 19, 2013; 2 pages.
India Application No. 448/DEL/2005; Office Action Mailed Jan. 22, 2014; 2 pages.
India Application No. 2733/DELNP/2005; Office Action Mailed Feb. 15, 2014; 2 pages.
Canada Application No. 2511397; Response to OA Mailed May 9, 2013 filed Oct. 7, 2014; 16 pages.
EP Application No. 04779478.9; Office Action Mailed May 20, 2014; 5 pages.
Armati, Douglas, "Tools and Standards for Protection, Control and Presentation of Data", ICSU Press, UNESCO, Apr. 3, 1996, 17 pages.
Bloom et al., "Copy Protection for DVD Video", Proceedings of the IEEE, vol. 87, Issue 7, Jul. 1999, pp. 1267-1276, 11 pages.
Bovet et al., "Understanding the LINUX Kernels," O'Reilly, USA, Oct. 2000, 542 pages.
Kaplan, Marc A.,"IBM Cryptolopes, SuperDistribution and Digital Rights Management", IBM Corporation, Dec. 30, 1996, 8 pages.
Thompson et al., "Digital Licensing," IEEE Internet Computing, Jul./Aug. 2005, vol. 9, No. 4, pp. 85-88, 4 pages.
Yu, Heather, "Digital Multimedia at Home and Content Rights Management", Proceedings 2002 IEEE 4th International Workshop on Networked Appliances, Jan. 15-16, 2002, pp. 49-56, 10 pages.

(56) References Cited

OTHER PUBLICATIONS

Non-Final Office Action mailed Aug. 7, 2007 from U.S. Appl. No. 11/116,598, 14 pages.
Response filed Nov. 7, 2007 to Non-Final Office Action mailed Aug. 7, 2007 from U.S. Appl. No. 11/116,598, 17 pages.
Final Office Action mailed Jul. 2, 2008 from U.S. Appl. No. 11/116,598, 18 pages.
Response filed Aug. 1, 2008 to Final Office Action mailed Jul. 2, 2008 from U.S. Appl. No. 11/116,598, 16 pages.
Advisory Acton mailed Aug. 13, 2008 from U.S. Appl. No. 11/116,598, 3 pages
Response filed Oct. 2, 2008 to Advisory Action mailed Aug. 13, 2008 from U.S. Appl. No. 11/116,598, 16 pages.
Requirement for Restriction/Election mailed Dec. 18, 2008 from U.S. Appl. No. 11/116,598, 6 pages.
Response filed Jan. 21, 2009 to Requirement for Restriction/Election mailed Dec. 18, 2008 from U.S. Appl. No. 11/116,598, 9 pages.
Response filed Feb. 12, 2010 to Final Office Action mailed Nov. 12, 2009 from U.S. Appl. No. 11/116,598, 11 pages.
Non-Final Office Action mailed Mar. 25, 2009 from U.S. Appl. No. 11/116,598, 13 pages.
Response filed Jun. 30, 2009 to Non-Final Office Action mailed Mar. 25, 2009 from U.S. Appl. No. 11/116,598, 14 pages.
Final Office Action mailed Nov. 12, 2009 from U.S. Appl. No. 11/116,598, 18 pages.
Non-Final Office Action mailed Apr. 14, 2010 from U.S. Appl. No. 11/116,598, 13 pages.
Examiner Initial Interview Summary mailed Jun. 29, 2010 from U.S. Appl. No. 11/116,598, 4 pages.
Response filed Jul. 14, 2010 to Non-Final Office Action mailed Apr. 14, 2010 from U.S. Appl. No. 11/116,598, 16 pages.
Final Office Action mailed Oct. 6, 2010 from U.S. Appl. No. 11/116,598, 20 pages.
Notice of Appeal filed Dec. 30, 2010 from U.S. Appl. No. 11/116,598, 2 pages.
Appeal Brief filed Dec. 30, 2010 from U.S. Appl. No. 11/116,598, 22 pages.
Reply Brief filed May 24, 2011 from U.S. Appl. No. 11/116,598, 11 pages.
Office Communication mailed Aug. 9, 2011 from U.S. Appl. No. 11/116,598, 2 pages.
Board of Appeals Docketing Notice mailed Aug. 15, 2011 from U.S. Appl. No. 11/116,598, 2 page.
Petition Decision mailed Jan. 8, 2015 from U.S. Appl. No. 11/116,598, 2 pages.
Decision on Appeal mailed Apr. 22, 2014 from U.S. Appl. No. 11/116,598, 8 pages.
Notice of Abandonment mailed Jun. 27, 2014 from U.S. Appl. No. 11/116,598, 2 pages.
Response filed Jul. 18, 2014 to Final Office Action mailed Oct. 6, 2010 and Decision on Appeal mailed Apr. 22, 2014 from U.S. Appl. No. 11/116,598, 20 pages.
Non-Final Office Action mailed Jun. 29, 2015 from U.S. Appl. No. 11/116,598, 21 pages.
Response filed Sep. 29, 2015 to Non-Final Office Action mailed Jun. 29, 2015 from U.S. Appl. No. 11/116,598, 21 pages.
Final Office Action mailed Oct. 26, 2015 from U.S. Appl. No. 11/116,598, 21 pages.
International Preliminary Report on Patentability mailed Nov. 1, 2007 from PCT Patent Application No. PCT/US2005/030490, 9 pages.
Amendment filed Apr. 1, 2013 from Taiwan Patent Application No. 94130187, 6 pages.
Notice of Acceptance mailed Mar. 17, 2010 from Australia Patent Application No. 2008203013, 3 pages.
Office Action mailed Jun. 22, 2010 from Mexico Patent Application No. MX/a/2008/007893, 3 pages.
Response filed Nov. 9, 2010 to Office Action mailed Jul. 8, 2010 from Mexico Patent Application No. MX/a/2008/007893, 13 pages.
Notice of Allowance mailed Dec. 8, 2010 from Mexico Patent Application No. MX/a/2008/007893, 3 pages.
Notice of Allowance mailed Oct. 19, 2012 from Japan Patent Application No. 2009-288223, 14 pages.
Notice of Allowance mailed May 28, 2013 from Mexico Patent Application No. MX/a/2011/002869, 2 pages.
Notice of Allowance mailed Jul. 15, 2013 from Mexico Patent Application No. MX/a/2011/002806, 2 pages.
Office Action mailed May 21, 2013 from Mexico Patent Application No. MX/a/2011/002807, 3 pages.
Notice of Allowance mailed Sep. 23, 2013 from Mexico Patent Application No. MX/a/2011/002807, 11 pages.
Office Action mailed Apr. 16, 2012 from European Patent Application No. 110075322, 3 pages.
Response filed May 7, 2012 to Official Communication mailed Apr. 16, 2012 from European Patent Application No. 11007532.2, 3 pages.
Response filed Jan. 25, 2013 to Official Communication mailed Sep. 10, 2012 from European Patent Application No. 110075322, 18 pages.
Notice of Allowance mailed Feb. 22, 2013 from Canada Patent Application No. 2771080, 2 pages.
Notice of Allowance mailed Dec. 31, 2012 from Canada Patent Application No. 2771038, 2 pages.
Notice of Allowance mailed Sep. 10, 2013 from Japan Patent Application No. 2012-214390, 5 pages.
Prosecution File History of U.S. Appl. No. 60/513,831, filed Oct. 23, 2003, 47 pages.
Prosecution File History of U.S. Appl. No. 10/820,673, filed Apr. 8, 2004, 561 pages.
Notice of Allowance mailed Nov. 22, 2011 from Japan Patent Application No. 2006-536592, 6 pages.
Amended Response filed Oct. 13, 2008 to Response to Office Action filed Oct. 8, 2008 from China Patent Application No. 200480003262.8, 10 pages.
Request for Examination and Amendment filed Jul. 24, 2009 from Korea Patent Application No. 10-2005-7012442, 21 pages.
Request for Examination and Voluntary Amendment mailed Jul. 29, 2009 from Canada Patent Application No. 2,511,397, 15 pages.
Response filed Aug. 29, 2012 to Examiner's Report mailed Mar. 22, 2012 from Canada Patent Application No. 2,511,397, 24 pages.
Notice of Allowance mailed Jun. 20, 2014 from Canada Patent Application No. 2,511,397, 2 pages.
Notice of Allowance mailed May 3, 2010 From Australia Patent Application No. 2004287144, 3 pages.
Decision on Grant mailed Oct. 24, 2008 from Russia Patent Application No. 2005-120664, 5 pages.
International Search Report and Written Opinion mailed May 12, 2006 from PCT Patent Application No. PCT/US04/24529, 14 pages.
Prosecution File History of U.S. Appl. No. 11/870,837, filed Oct. 11, 2007, 700 pages.
Response filed May 7, 2008 to the Third Office Action mailed Apr. 7, 2008 from China Patent Application No. 333145223.X, 24 pages.
Response filed Sep. 27, 2012 to Non-Final Office Action mailed Jun. 27, 2012 from U.S. Appl. No. 11/116,689, 16 pages.
Final Office Action mailed Nov. 5, 2012 from U.S. Appl. No. 11/116,689, 15 pages.
Response filed Feb. 5, 2013 to Final Office Action mailed Nov. 5, 2012 from U.S. Appl. No. 11/116,689, 15 pages.
Non-Final Office Action mailed Sep. 10, 2014 from U.S. Appl. No. 11/116,689, 21 pages.
Response filed Dec. 10, 2014 to Non-Final Office Action mailed Sep. 10, 2014 from U.S. Appl. No. 11/116,689, 14 pages.
Notice of Allowance and Examiner Initiated Interview Summary mailed Feb. 23, 2015 from U.S. Appl. No. 11/116,689, 13 pages.
Notice of Allowance mailed Jun. 12, 2015 from U.S. Appl. No. 11/116,689, 9 pages.
Petition to Accept Unintentionally Delayed Priority Claim filed Sep. 14, 2015 from U.S. Appl. No. 11/116,689, 4 pages.
Prosecution File History of U.S. Appl. No. 60/673,979, filed Apr. 22, 2005, 406 pages.
Prosecution File History of U.S. Appl. No. 11/191,448, filed Jul. 28, 2005, 822 pages.

(56) References Cited

OTHER PUBLICATIONS

Notice of Allowance and Notice of Grant mailed Jul. 5, 2012 from China Patent Application No. 200580049524.9, 1 pages.
Notice of Allowance mailed Apr. 22, 2013 from Korea Patent Application No. 10-2007-7023842, 5 pages.
Notice of Allowance mailed Jun. 18, 2010 from China Patent Application No. 200680013409.0, 4 pages.
Notice of Allowance mailed Feb. 22, 2013 from Korea Patent Application No. 2007-7024156, 5 pages.
Notice on Grant mailed Jun. 2, 2011 from China Patent Application No. 200680013372.1, 4 pages.
Request for Examination and Amendment filed Mar. 14, 2011 from Korea Patent Application No. 10-2007-7024139, 12 pages.
Notice of Allowance mailed Jun. 1, 2012 from Korea Patent Application No. 10-2007-7024139, 3 pages.
Notice on Grant mailed Jan. 29, 2010 from China Patent Application No. 200580049553.5, 4 pages.
Notice of Appeal and Appeal Brief filed Nov. 23, 2012 from Korea Patent Application No. 10-2007-7024145, 22 pages.
Notice of Allowance mailed Jan. 17, 2013 from Korea Patent Application No. 10-2007-7024145, 7 pages.
Notice on Grant mailed Sep. 2, 2011 from China Patent Application No. 200810189718.4, 4 pages.
Notice of Allowance mailed Jan. 5, 2012 from China Patent Application No. 200810189719.9, 4 pages.
Prosecution File History of U.S. Appl. No. 11/202,840, filed Aug. 12, 2005, 125 pages.
Prosecution File History of U.S. Appl. No. 11/202,838, filed Aug. 12, 2005, 244 pages.
Office Action mailed Jan. 22, 2016 from Norway Patent Application No. 20032887, 2 pages.
International Preliminary Report and Written Opinion mailed Nov. 1, 2007 from PCT Patent Application No. PCT/US2005/030489, 7 pages.
Marsh, Dave, "Output Content Protection and Windows Longhorn," WinHEC 2005 Version, Apr. 27, 2005, retrieved at <<http://librarian.netinavon/paper/Output_Content_Protection_and_Windows_Longhorn.pdf?paperid=3545820>> on Feb. 20, 2006, 45 pages.
Prosecution File History of U.S. Appl. No. 12/390,505, filed Feb. 23, 2009, 735 pages.
Prosecution File History of U.S. Appl. No. 10/798,688, filed Mar. 11, 2004, 523 pages.
Examination Report mailed Dec. 19, 2006 from European Patent Application No. 05101873.7-1247, 6 pages.
Notice of Allowance mailed Aug. 12, 2011 from Japan Patent Application No. 2005-067120, 6 pages.
Notice of Allowance mailed Sep. 14, 2010 from China Patent Application No. 200510056328.6, 4 pages.
Request for Examination and Amendment filed Mar. 3, 2010 from Korea Patent Application No. 10-2005-0020623, 22 pages.
Prosecution File History of U.S. Appl. No. 12/715,529, filed Mar. 2, 2010, 446 pages.
Notice of Allowance mailed May 6, 2013 from China Patent Application No. 201010192452.6, 8 pages.
Prosecution File History of U.S. Appl. No. 10/835,951, filed Apr. 30, 2004, 227 pages.
Non-Final Office Action mailed Oct. 24, 2008 from U.S. Appl. No. 11/116,689, 13 pages.
Response filed Jan. 23, 2009 to Non-Final Office Action mailed Oct. 24, 2008 from U.S. Appl. No. 11/116,689, 14 pages
Final Office Action mailed Mar. 30, 2009 from U.S. Appl. No. 11/116,689, 13 pages.
Response filed Apr. 30, 2009 to Non-Final Office Action mailed Mar. 30, 2009 from U.S. Appl. No. 11/116,689, 14 pages.
Advisory Action mailed May 22, 2009 from U.S. Appl. No. 11/116,689, 4 pages.
Notice of Appeal mailed Jun. 30, 2009 from U.S. Appl. No. 11/116,689, 2 pages.
Preliminary Brief Conference Request filed Jun. 30, 2009 from U.S. Appl. No. 11/116,689, 7 pages.
Preliminary Brief Appeal Conference Decision mailed Aug. 27, 2009 from U.S. Appl. No. 11/116,689, 2 pages.
Non-Final Office Action mailed Oct. 28, 2009 from U.S. Appl. No. 11/116,689, 12 pages.
Response filed Jan. 25, 2010 to Non-Final Office Action mailed Oct. 28, 2009 from U.S. Appl. No. 11/116,689, 17 pages.
Final Office Action mailed May 4, 2010 from U.S. Appl. No. 11/116,689, 14 pages.
Notice of Appeal mailed Aug. 31, 2010 from U.S. Appl. No. 11/116,689, 2 pages.
Preliminary Brief Conference Request filed Aug. 31, 2010 from U.S. Appl. No. 11/116,689, 5 pages.
Preliminary Brief Appeal Conference Decision mailed Sep. 17, 2010 from U.S. Appl. No. 11/116,689, 2 pages.
Appeal Brief filed Oct. 26, 2010 from U.S. Appl. No. 11/116,689, 25 pages.
Non-Final Office Action mailed Mar. 4, 2011 from U.S. Appl. No. 11/116,689, 10 pages.
Examiner Interview Summary mailed May 19, 2011 from U.S. Appl. No. 11/116,689, 3 pages.
Response filed Jun. 6, 2011 to the Non-Final Office Action mailed May 19, 2011 from U.S. Appl. No. 11/116,689, 20 pages.
Non-Final Office Action mailed Aug. 30, 2011 from U.S. Appl. No. 11/116,689, 10 pages.
Response filed Nov. 9, 2011 to Non-Final Office Action mailed Aug. 30, 2011 from U.S. Appl. No. 11/116,689, 12 pages.
Non-Final Office Action mailed Jun. 27, 2012 from U.S. Appl. No. 11/116,689, 14 pages.
"Boxing Up Bytes", 2 pages.
"How two publishing houses maintain control of copyright", Managing Digital Rights in Online Publishing, Information Management & Technology, Jul. 2001, 34 (4), 2 pages.
Britton et al., "Transcoding: Extending E-Business to New Environments", IBM Systems Journal, vol. 40, No. 1, 2001, pp. 153-178, 27 pages.
Notice of Rejection mailed Apr. 3, 2009 from Japan Patent Application No. 2003-183597, 9 pages.
Seok-Kim et al., "A Secure and Efficient Metering Scheme for Internet Advertising", Journal of KISS: Computer Systems and Theory, 2002, pp. 153-160, 9 pages.
Notice of Allowance mailed Oct. 30, 2009 from Japan Patent Application No. 2003-183597, 6 pages.
Prosecution File History of U.S. Appl. No. 09/525,510, filed Mar. 15, 2000, 646 pages.
International Search Report mailed Nov. 22, 2000 from PCT Patent Application No. PCT/US00/23107, 3 pages.
International Preliminary Examination Report mailed Jan. 31, 2002 from PCT Patent Application No. PCT/US00/23107, 2 pages.
Prosecution File History of U.S. Appl. No. 11/866,041, filed Oct. 2, 2007, 298 pages.
Prosecution File History of U.S. Appl. No. 10/185,511, filed Jun. 28, 2002, 689 pages.
Partial Search Report mailed Feb. 20, 2006 from European Patent Application No. 03013556.0, 5 pages.
Additional Search Report mailed Oct. 25, 2006 from European Patent Application No. 03013556.0, 7 pages.
Examination Report mailed Jun. 6, 2007 from European Patent Application No. 03013556.0, 4 pages.
Response filed Oct. 16, 2007 to the Examination Report mailed Jun. 6, 2007 from European Patent Application No. 03013556.0, 25 pages.
Office Action mailed Jan. 17, 2011 from European Patent Application No. 03013556.0, 4 pages.
Response filed May 24, 2011 to the Office Action mailed Jan. 17, 2011 from European Patent Application No. 33013556.0, 16 pages.
Summons mailed Sep. 39, 2013 from European Patent Application No. 03013556.0, 5 pages.
Notice of Rejection mailed Dec. 5, 2008 from Japan Patent Application No. 2003-183597, 12 pages.
Response filed Mar. 5, 2009 to the Notice of Rejection mailed Dec. 5, 2008 from Japan Patent Application No. 2003-183597, 14 pages.

(56) References Cited

OTHER PUBLICATIONS

Prosecution File History of U.S. Appl. No. 10/178,256, filed Jun. 24, 2002, 463 pages.
Response filed Dec. 29, 2014 to Official Communication mailed Nov. 19, 2014 from European Patent Application No. 03011235.3, 27 pages.
Notice of Allowance mailed Jan. 15, 2010 from Japan Patent Application No. 2003-180214, 6 pages.
Voluntary Submission of Information filed Jul. 29, 2008 from Canada Patent Application No. 2428953, 1 pages.
Voluntary Submission of Information filed Sep. 30, 2010 from Canada Patent Application No. 2428953, 1 page.
Office Action mailed Dec. 20, 2011 from Canada Patent Application No. 2428953, 3 pages.
Office Action mailed Jun. 4, 2012 from Canada Patent Application No. 2428953, 2 pages.
Office Action mailed Aug. 31, 2012 from Canada Patent Application No. 2428953, 2 pages.
Notice of Allowance mailed Jan. 15, 2013 from Canada Patent Application No. 2428953, 2 pages.
Amendment after Allowance filed Feb. 6, 2013 from Canada Patent Application No. 2428953, 3 pages.
First Office Action mailed Aug. 17, 2007 from Australia Patent Application No. 2003204380, 15 pages.
Notice of Acceptance mailed May 29, 2008 from Australia Patent Application No. 2003204380, 2 pages.
Prosecution File History of U.S. Appl. No. 11/275,990, filed Feb. 8, 2006, 160 pages.
Prosecution File History of U.S. Appl. No. 11/275,991, filed Feb. 8, 2006, 206 pages.
Prosecution File History of U.S. Appl. No. 11/938,707, filed Nov. 12, 2007, 599 pages.
Notice of Allowance mailed Jun. 27, 2008 from China Patent Application No. 033145223.X, 4 pages.
Hearing Notice mailed May 11, 2010 from India Patent Application No. 509/MUM/2003, 1 page.
Response filed Dec. 16, 2009 to Office Action mailed Oct. 23, 2009 from Poland Patent Application No. P360755, 17 pages.
Response filed Jun. 7, 2010 to Hearing Notice mailed May 17, 2010 from India Patent Application No. 509/MUM/2003, 12 pages.
Prosecution File History of U.S. Appl. No. 11/275,993, filed Feb. 8, 2006, 405 pages.
Office Action mailed Mar. 7, 2015 From Norway Patent Application No. 20032887, 6 pages.
Response filed Mar. 24, 2008 to Registrar of Patents' Substantive Examination Adverse Report mailed Dec. 24, 2007 from Malaysia Patent Application No. PI 20031863, 8 pages.
Notice of Allowance mailed Mar. 20, 2009 from Malaysia Patent Application No. PI 20031863, 3 pages.
Examination Report mailed Aug. 4, 2009 from India Patent Application No. 509/MUM/2003, 1 page.
Marsh, Dave, "Output Content Protection and Windows Longhorn," WinHEC 2005 Version, Apr. 27, 2005, retrieved at <<http://librarian.net/navon/paper/Output_Content_Protection_and_Windows_Longhorn.pdf?paperid=3545820>> on Feb. 20, 2006, 45 pages.
Schneier, B., "Applied Cryptography", Applied Cryptography, Protocols, Algorithms and Source Code in C, 1996, 2nd Edition, pp. 584-587, 5 pages.
Schneier, B., "Applied Cryptography", Applied Cryptography, Protocols, Algorithms and Source Code in C, 1996, pp. 183-187, 5 pages.
Schneier, B., "Applied Cryptography", Applied Cryptography, Protocols, Algorithms and Source Code in C, 1996, pp. 574-577, 4 pages.
Communication re receipt of Reply Brief mailed Aug. 9, 2011 from U.S. Appl. No. 11/116,598, 2 pages.
Office Action mailed Mar. 15, 2016 from European Patent Application No. 05101873.7, 6 pages.
First Examination Report mailed Apr. 21, 2016 from India Patent Application No. 1764/MUM/2010, 2 pages.

\* cited by examiner

ESTABLISHING A UNIQUE SESSION KEY USING A HARDWARE FUNCTIONALITY SCAN

CROSS-REFERENCE TO RELATED APPLICATION

This application claims the benefit of U.S. Provisional Patent Application No. 60/673,979 filed Apr. 22, 2005, the contents of which are hereby incorporated by reference.

BACKGROUND

This description relates generally to computer security and more specifically to encryption methods and the establishing of private encryption keys in various computer devices for the transmission of digital media and the like.

Such a system may include any number of components that may be coupled by a variety of interfaces that typically seek verification of sufficient security exists before transmitting content. Such systems typically require devices which will play the protected content, to encrypt the protected content such that only a device with an appropriate secret key will be able to decrypt the content. A chain of trust may be used to establish security in such a system. As the use of these systems increases, security tends to become more of a concern due to the increasing transmission of valuable content, and the fact that unauthorized users tend to become more sophisticated in gaining access to protected content.

A provider of high value content or information may wish to ensure that a conventional open computing system such as a PC is secure. A PC and many processor based systems typically present an open system in which hardware components may be easily removed and replaced. Hardware components may include processors, graphics chips, audio codec chips, and the like. Such an open system may present multiple access points for unauthorized access to the content.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a PC based system, the system described is provided as an example and not a limitation. As those skilled in the art will appreciate, the present examples are suitable for application in a variety of different types of computing systems.

Figure 1:
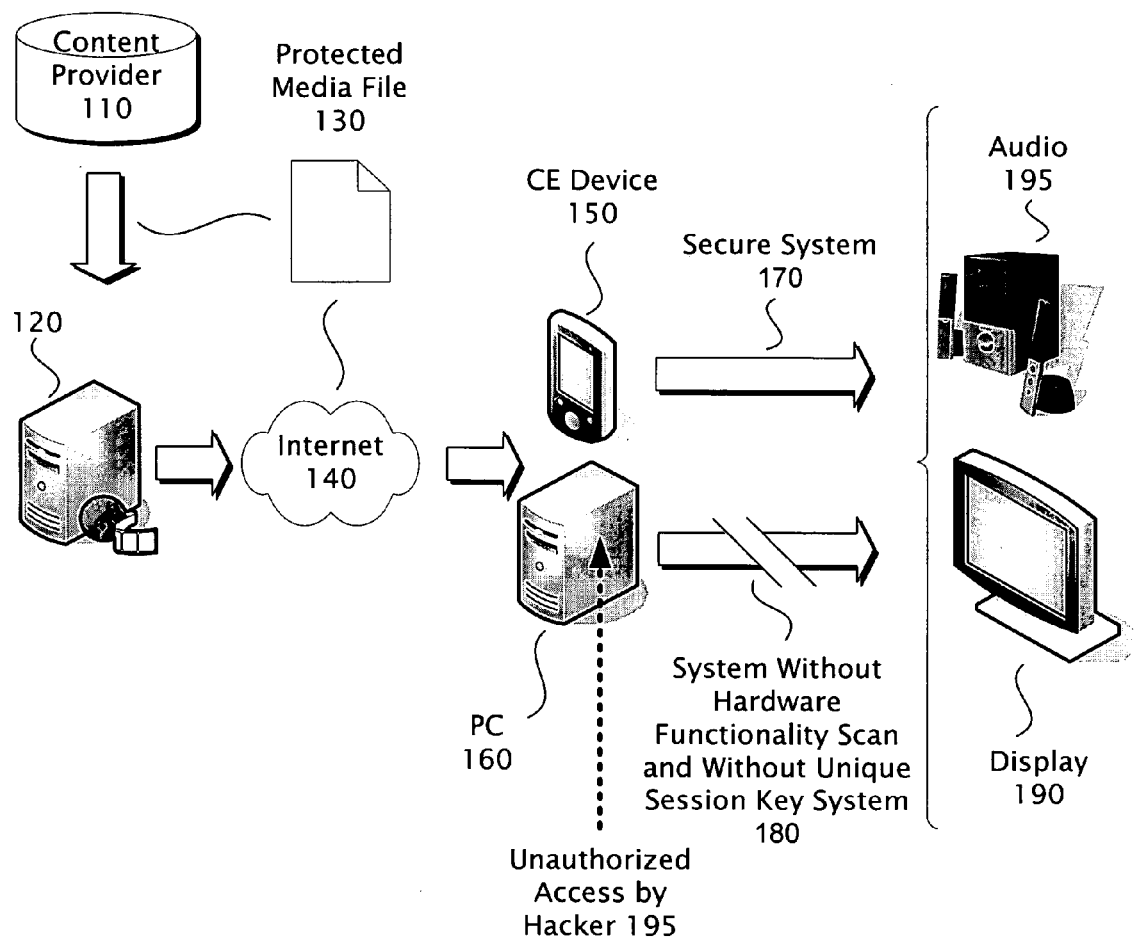
FIG. 1 is a block diagram showing a conventional PC having conventional security, and a typically secure consumer electronics ("CE") device each without a hardware functionality scan ("HFS") system and without a unique session key system.

FIG. 1 is a block diagram showing a conventional PC 160 having conventional security and a typically physically secure consumer electronics ("CE") device 150 each without a hardware functionality scan ("HFS") system and without a unique session key system 180 that may be used to play a conventional protected media file 130. Such a PC 160 without a hardware functionality scan system and without a unique session key system 180 may leave the protected media file 130 susceptible to interception by a hacker or another unauthorized party 195.

The content provider 110 is typically coupled to a media server 120. The content provider 110 typically places the protected media file 130 on the media server 120. The protected media file 130 may be created at the media server from content provided by the service provider, or the service provider may provide a protected media file 130 to the media server 120. The protected media file 130 typically includes audio and visual information or the like. The media server 120 is typically coupled to the internet 140, and the internet 140 is typically coupled to either a PC 160 or a CE device 150. The PC 160 or CE device 150 are but two examples of devices that are equipped with a processor. It is specifically contemplated that a variety of devices may equivalently substituted for a PC 160 or CE Device 150. It is also specifically contemplated that the content provider 110 is not limited in the manner in which the content provider 110 distributes the protected media file 130 to the PC 160 or the CE device 150. In the following description it will be understood that the term PC may include CE devices, processor board devices, and the like.

A CE device 150 is typically not easy to tamper with because of the fixed configuration of these devices and therefore typically may be considered more secure. In contrast, a PC 160 may typically be easy to tamper with because the hardware of the PC 160 may be more easily accessible and may typically be considered less secure.

The conventional secure system 170 is typically part of a CE Device 150, the secure system 170 typically includes PC components and methods of protection which may satisfy the content provider 110 that unauthorized access by a hacker 195 may not occur. The conventional secure system 170 may include a CPU, a display 190 which typically renders image information so it may be viewed, and/or an audio device 195 which typically converts digital audio signals to analog signals for play on a conventional audio speaker. Such a conventional secure system 170 may allow playing of protected media file 130 on the display 190 and/or audio device 195.

In a conventional PC system, the PC 160 is typically coupled to an external display or monitor 190 and/or an audio device 195 using a system without hardware scan functionality and with a unique session key system 180. The connection between the processor in the CPU and the processor of a graphics device and/or the audio codec device may allow unauthorized access by a hacker 195 at this point. Such a system may typically not allow playing of protected media file 130 on the display 190 and/or audio device 195 because the necessary security elements may not be in place.

Figure 2:
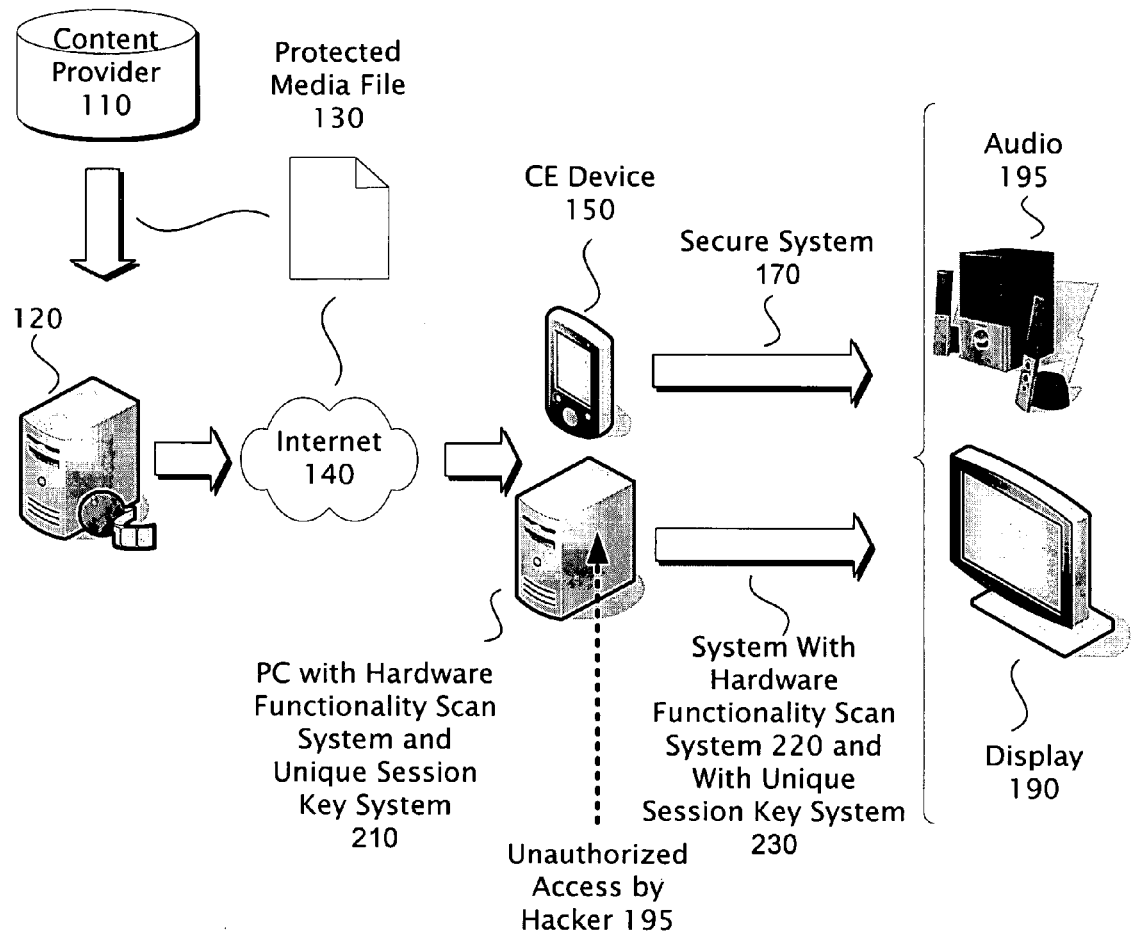
FIG. 2 is a block diagram showing a PC with and a CE device with a hardware functionality scan system and with a unique session key system.

FIG. 2 is a block diagram showing a PC 210 with a hardware functionality scan system and with a unique session key system and a CE device 150 without a hardware functionality scan system and without a unique system. The content provider 110 is typically coupled to a media server 120. The content provider 110 typically places the protected media file 130 on the media server 120 and the protected media file 130 typically includes audio and visual information or the like. The media server 120 is usually coupled to the internet 140, and the internet 140 is typically coupled to a PC 210. A CE device 150 may also be coupled to a secure system 170 in the alternative example. The secure system 170 typically includes properties which may satisfy the content provider 110 that unauthorized access by hacker 195 may not occur. In this alternative example, the internet 140 may be typically coupled the CE Device 150.

The PC 210 may be coupled to a display 190 which typically renders image information so it may be viewed and a set of speakers 195 or other audio equipment which typically allows audio information to be heard. The PC 210 may typically include a hardware functionality scan system 220 and/or a unique session key system 230.

A hardware functionality scan ("HFS") system 220 may further verify the security permission requested by the content provider 110 to insure that a hacker or other unauthorized party 195 is not accessing an unprotected version of the protected media file 130 at a vulnerable point. A hardware functionality scan is typically performed to verify a security permission on the PC 160, the security permission typically indicating a proper hardware configuration to prevent unauthorized emulation of the receiving device by hacker 195 in order to access the protected media file 130.

The HFS system 220 may make use of the complex nature of a hardware device within the HFS system 220 such that the results of a query made up of one or more complex operations may uniquely identify the hardware device when the results of the query returned from the hardware device are analyzed. This analysis may be performed by comparing the results of the query returned by the hardware device to the expected result in a table, or may also be performed by performing an identical query using a software emulation of the hardware device in a secure location and comparing the results of the identical query to the results returned by the hardware device.

A unique session key system 230 may further increase the security of the PC 210 and utilize a portion of a hardware functionality scan to establish a unique session key in any of the hardware devices within the PC 210. Note that a unique session key may also be referred to as a device key and the two terms may be used interchangeably. The unique session key increases security in the PC 210 because it may be known only to one or more devices communicatively coupled within the unique session key system 230 and may not have been transmitted between the one or more devices communicatively coupled within the unique session key system 230. The one or more devices communicatively coupled within the unique session key system 230 may then utilize the unique session key to encrypt any information they may wish to exchange. Because the unique session key may not have been transmitted between the one or more devices communicatively coupled within the unique session key system 230, the unique session key remains private to the one or more devices communicatively coupled within the unique session key system 230 and may be considered a secure unique session key.

The results of the queries discussed above may create a set of identical complex information independently at one or more separate locations within the HFS system 220. A unique session key system 230 may be implemented to make use of the identical complex information generated independently at one or more separate locations with the HFS system 220 to generate a unique secret session key. The unique session key system 230 may generate a unique session key by passing the results of the query through a one-way function. A one-way function is a cryptographic function well known to those in the art, and may typically be a mathematical function which is easier to compute in a forward direction but is much more difficult to reverse engineer and discover the construction of the one-way function. That is, the one-way function may accept an input and easily create an output, but it may be difficult and may be impossible to generate the input given a particular output. Some examples of a suitable one way function may include the secure hashing algorithm version 1.0 ("SHA1") and the advanced encryption standard ("AES") Davies-Meyer hash function.

The inclusion of a hardware functionality scan system 220, a unique session key system 230, or a combination of both a hardware functionality scan system 220 and/or a unique session key system 230 to the PC 160 of FIG. 1 may make the PC 160 as secure as the CE device 150. That is, the inclusion of a hardware functionality scan system 220 and a unique session key system 230 may make the more open and accessible PC 210 as secure as the closed and inaccessible CE Device 150.

Figure 3:
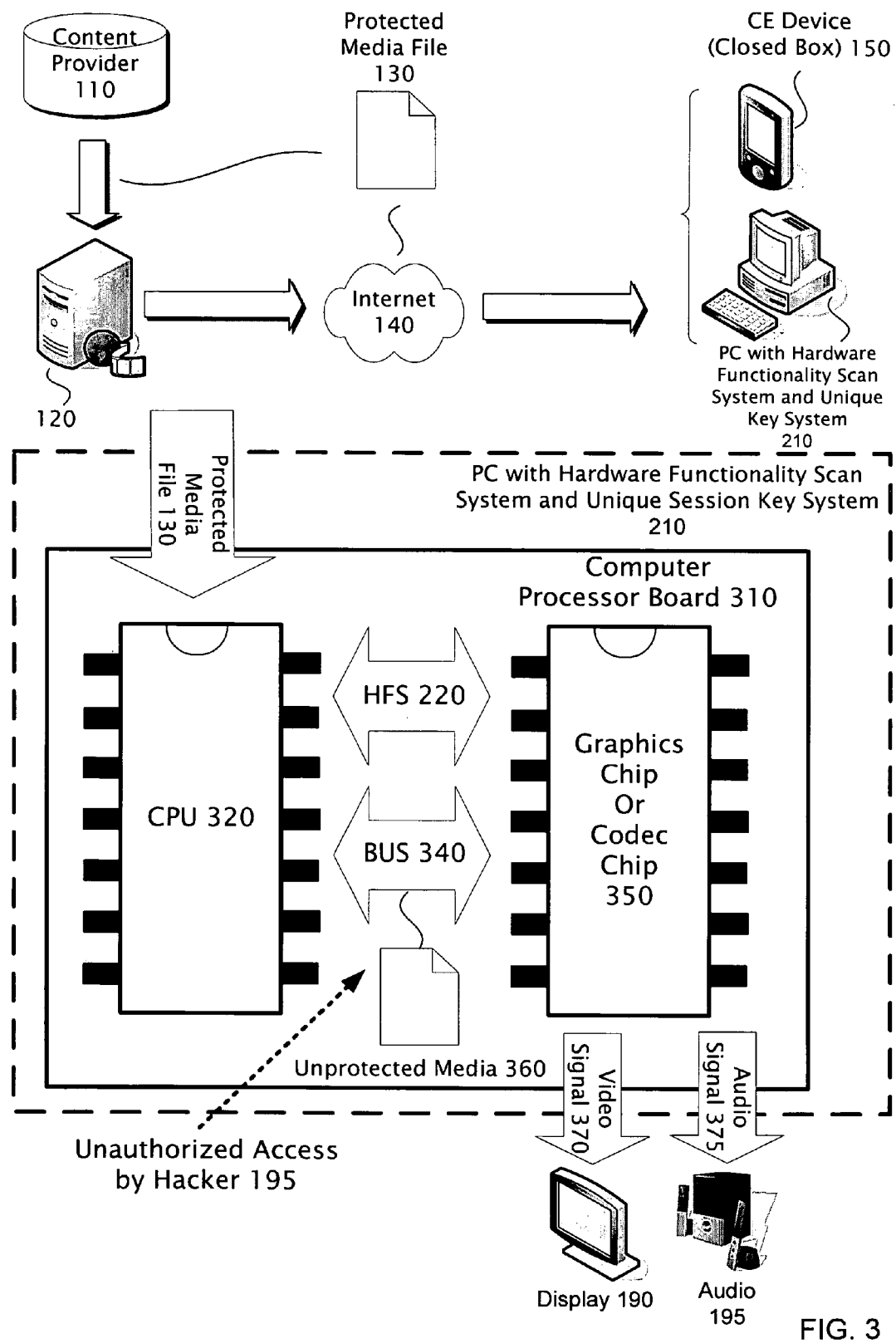
FIG. 3 is a block diagram of a computer processor board of a CPU having an HFS system and a unique session key system to generate a unique session key in the CPU and in the graphics device or codec device.

FIG. 3 is a block diagram of a computer processor board of a PC having an HFS system 220 and a unique session key system 210 to generate a unique session key in the CPU and in the graphics device or codec device. A PC having hardware functionality scan 220 capabilities and/or a unique session key system 230 typically includes a computer processor board 310 which may contain a CPU 320 coupled to a bus 340. The bus 340 may be coupled in turn to a graphics device or codec device 350.

The graphics device or codec device 350 may represent a complex integrated circuit ("IC") which may render shapes in unique ways in the case of a graphics device or which may convert a digital audio to an analog signal for play on an audio speaker in the case of an audio codec device. In general, the typical complexity of a graphics device and any unique rendering signatures it possesses may be used to verify that the graphics device or codec device 350 is present instead of an emulation device which may have been put in place by a hacker. Further, the typical complexity of a codec device and any unique decoding signatures it possesses may be used to verify that the graphics device or codec device 350 is present instead of a hacker.

Unauthorized access by a hacker 195 may be attempted through the use of a device emulation that attempts to mimic the real graphics chip or codec chip 350, and would allow the hacker to access and copy the unprotected media 360. In such an arrangement the CPU 320 would not have information that anything but a "real" graphics chip or codec chip 350 is present. That is, the CPU 320 may not receive any indication that an emulator is intercepting the unprotected content. However, such an emulator that mimics the real graphics chip or codec chip 350 may not be able to simulate the complexity of the real graphics chip or codec chip 350, and therefore may not be able to produce the unique rendering signatures or decoding signatures of the real graphics chip or codec chip 350.

A hardware functionality scan system 220 may make use of a such a lack of the emulator to simulate the complexity of the real graphics chip or codec chip 350 and test such complexity, a failure of such a hardware functionality scan 220 indicating a hacker 195 is present instead of a real graphics chip or codec chip 350. Thus a device which mimics the real graphics chip or codec chip 350 may not be verified by a system including a hardware functionality scan 220.

In addition, the content provider 110 may seek to prevent unauthorized copying or viewing of the protected media file 130 by requesting the CPU 320 digitally encrypt protected media file 130 with a key typically kept secret such that it is only known by the CPU 320 and the manufacturer of the graphics chip or codec chip 350. Such a secret key may satisfy the content provider 110 that the encryption may prevent unauthorized copying or viewing of the protected media file if the secret key is independently derived by the CPU 320 and the graphics chip or codec chip 350. The independent derivation of the secret key by the CPU 320 and the graphics chip or codec chip 350 may ensure the key is not transmitted across the bus 340. In an alternative example, unauthorized access by a hacker may be attempted through the discovery of a secret key used to encrypt the protected media file 130 as it passes over the bus 340. In discovering the secret key used to encrypt the protected media file 130, a hacker may use the discovered secret key to decrypt the protected media file and make an unauthorized copy of the protected media file 130.

An example of a Digital Rights Management encryption system is provided in U.S. patent application Ser. No. 09/290,363, filed Apr. 12, 1999, U.S. patent application Ser. Nos. 10/185,527, 10/185,278, and 10/185,511, each filed on Jun. 28, 2002 which are hereby incorporated by reference in its entirety. The authorized PC 210 may use the CPU 320 to decrypt the protected media file 130 and produce unprotected media 360. The unprotected media 360 is typically passed across the bus 340 in either re-encrypted or unencrypted form to the graphics device or codec chip 350, which may convert the unprotected media 360 into a video signal 370 which may be displayed by display 190 and/or an audio signal 375 which may be turned into sound waves by audio device 195.

As previously noted, the unprotected media 360 may be susceptible to unauthorized access by a hacker 195 which may take the form of the hacker or any unauthorized user intercepting the unprotected media 360 on the bus 340. For example, if the CPU 320 did not encrypt the unprotected media 360, a hacker may be able to investigate the bus 340 and discover a version of the protected media file 130 which may be ready for play back by the graphics chip or codec chip 350 without any additional processing, which may make the unprotected media 360 easy to copy by a hacker 195 as the unprotected media 360 requires no additional processing for play back.

A content provider 110 who has taken care to protect the delivery of content may also wish to take steps to protect high value content from a hacker 195 and prevent the hacker 195 from making an unauthorized copy in this way. As noted earlier, PC's typically have an open architecture which may make them susceptible to tampering. While a CE Device 150 may be a closed box system wherein it may be difficult for a hacker to replace secure system 170 with a device capable of copying unprotected media 360, PC 210 is an open box system in which it may be easy for a hacker or any other unauthorized party to either replace a system without a hardware functionality scan system and without a unique session key system 180 with a system which is capable of copying unprotected media 360. Therefore, before content provider 110 may allow protected media file 130 to be downloaded or streamed to PC 210, content provider 110 may require that the PC 210 has the hardware authentication afforded by HFS 220 and is coupled to graphics chip or codec chip 350 and not some other capture device which mimics graphics chip or codec chip 350 put in place by a hacker 195 or any unauthorized user. In addition, the content provider 110 may further require a unique session key be established and may require the content be encrypted using the unique session key.

The graphics chip or codec chip 350 may contain a digitally signed certificate which the CPU 320 may typically query in order to verify the authenticity of graphics chip or codec chip 350. However, due to the properties of the manufacturing process used to create graphics chip or codec chip 350, it may not be possible to encode such a digitally signed certificate in each graphics chip or codec chip 350. A hardware functionality scan ("HFS") 220 may not have such manufacturing limitations and therefore, the CPU 320 may perform a hardware functionality scan ("HFS") 220 in order to verify the authenticity of the graphics chip or codec chip 350.

A hardware functionality scan system 220 may not have such manufacturing limitations as a graphics chip or codec chip 350 is typically a complex device which may be made up of a large number of logic gates across one or more integrated circuits coupled to one another in complex arrangements. A graphics chip or codec chip 350 may also render shapes and other graphical elements in a unique manner in the case of a graphics chip or which may convert a digital audio signal to an analog audio signal for play on an audio speaker in the case of a codec chip. Further, the conversion from a digital audio signal to an analog audio signal which may be performed by the audio codec chip may produce characteristics which may be unique to the specific audio codec chip. The unique manner in which a graphics chip or codec chip 350 may render graphical elements and/or convert a stream of digital audio may be utilized by a CPU 320 to verify that it is coupled to a real graphics device 350 or graphics chip or codec chip 350 and not some other device which mimics the graphics chip or codec chip 350. The CPU 320 may perform a hardware functionality scan 220 by performing queries to test the unique complex hardware structure of the graphics chip or codec chip 350 such as submitting a shape or other graphical element to the graphics chip or codec chip 350 for rendering and comparing the results of the rendering to an expected result. Typically due to the complexity of the graphics chip or codec chip 350 it is difficult to duplicate or produce by emulation the correct response to the hardware functionality scan 220 by a hacker or another unauthorized party.

To uniquely identify the graphics chip or codec chip 350 the queries or requests of the graphics chip or codec chip 350 may be constructed in such a way that only the specific graphics chip or codec chip 350 may be capable of providing an answer or response that verifies the graphics chip or codec chip 350. This is typically possible because the graphics chip or codec chip 350 as well as graphics and audio devices in general are composed of a complex arrangement of a large number of gates and have implemented upon them a typically complex state model. Therefore, the same question or request made of two differently manufactured models of graphics and/or audio devices may result in a different answer, or return a different result. An analysis of the answer or returned results may typically identify the specific graphics chip or codec chip 350.

For example, in the case of a graphics chip, the CPU 320 may send a three dimensional shape to the graphics or codec chip 350 and request the graphics chip or codec chip 350 perform a transformation in three dimensional space, such as shading the three dimensional shape. The graphics chip or codec chip 350 may then send the resulting transformed or rendered three dimensional shape to the CPU 320. The CPU 320 may examine the returned result to determine if the mathematical representation of the transformed complex three dimensional shape agrees with the results expected by the CPU 320. Comparisons may be made by consulting a lookup table or a software emulation of the hardware or the like.

In another example, the CPU 320 may have stored a complex mathematical expression. A typical expression would exercise the areas of the graphics chip or codec chip 350 that would typically calculate a unique and known answer for the manufactured model. Further, a typical expression may also include random data, either in the form of agreed upon random parameters to the expression, and/or the expression itself may be chosen at random. For example, a calculated result may have a unique number of digits or a known rounding error that may be exploited. Further, in another example, graphics chip or codec chip 350 may have been manufactured such that additional boundary scan circuitry within the integrated circuits may have been added to verify the functioning of the graphics device 350 in the factory. The boundary scan circuitry may be unique to each model of graphics chip or codec chip 350 and CPU 320 may query the boundary scan circuitry and analyze the results to verify graphics chip or codec chip 350.

Once the CPU 320 has verified the graphics chip or codec 350, the CPU may send the unprotected media 360 across the bus 340 so it may be played by the graphics chip or codec chip 350. However, if the protected media file 360 is not encrypted in some manner, unauthorized access by a hacker 195 may still occur at this point as the hacker 195 may intercept the unencrypted unprotected media file 360 as it passes over the bus 340. Therefore, content provider 110 may not allow CPU 320 to send the unprotected media file 360 across the bus 340 to the graphics chip or codec chip 350 unless the CPU 320 and the graphics chip or codec chip 350 include some method of encrypting the unprotected media file 360 and decrypting the unprotected media file 360. Such an encryption method typically involves the use of pre-defined private encryption keys which are securely included in CPU 320 and graphics chip or codec chip 350.

However, due to the properties of the manufacturing process used to create graphics chip or codec chip 350, it may not be possible to include such a private encryption key in each graphics chip or codec chip 350. As discussed earlier, a hardware functionality scan ("HFS") 220 may not have such manufacturing limitations and therefore, the CPU 320 may perform a hardware functionality scan ("HFS") 220 in order to verify the authenticity of the graphics chip or codec chip 350. Such a hardware functionality scan 220 may produce an identical set of complex and unique information independently at the CPU 320 and at the graphics chip or codec chip 350. Such identical complex and unique information may then be passed through a one-way function both by the CPU 320 and the graphics chip or codec chip 350 to create the same session key in both the CPU 320 and the graphics chip or codec chip 350 or any other type of typically complex integrated circuit chip. Note that in order for the session key to remain secure from a hacker 195, the CPU 320 sends the query however the graphics chip or codec chip 350 does not send a response to the query.

Once the session key has been created, further session keys may be independently created at the CPU 320 and the graphics chip or codec chip 350 and these further session keys may be encrypted and transmitted over the bus 340. It is also specifically contemplated that other methods of using the complex and unique information generated by a hardware functionality scan 220 to create a unique session key may be equivalently substituted.

Figure 4:
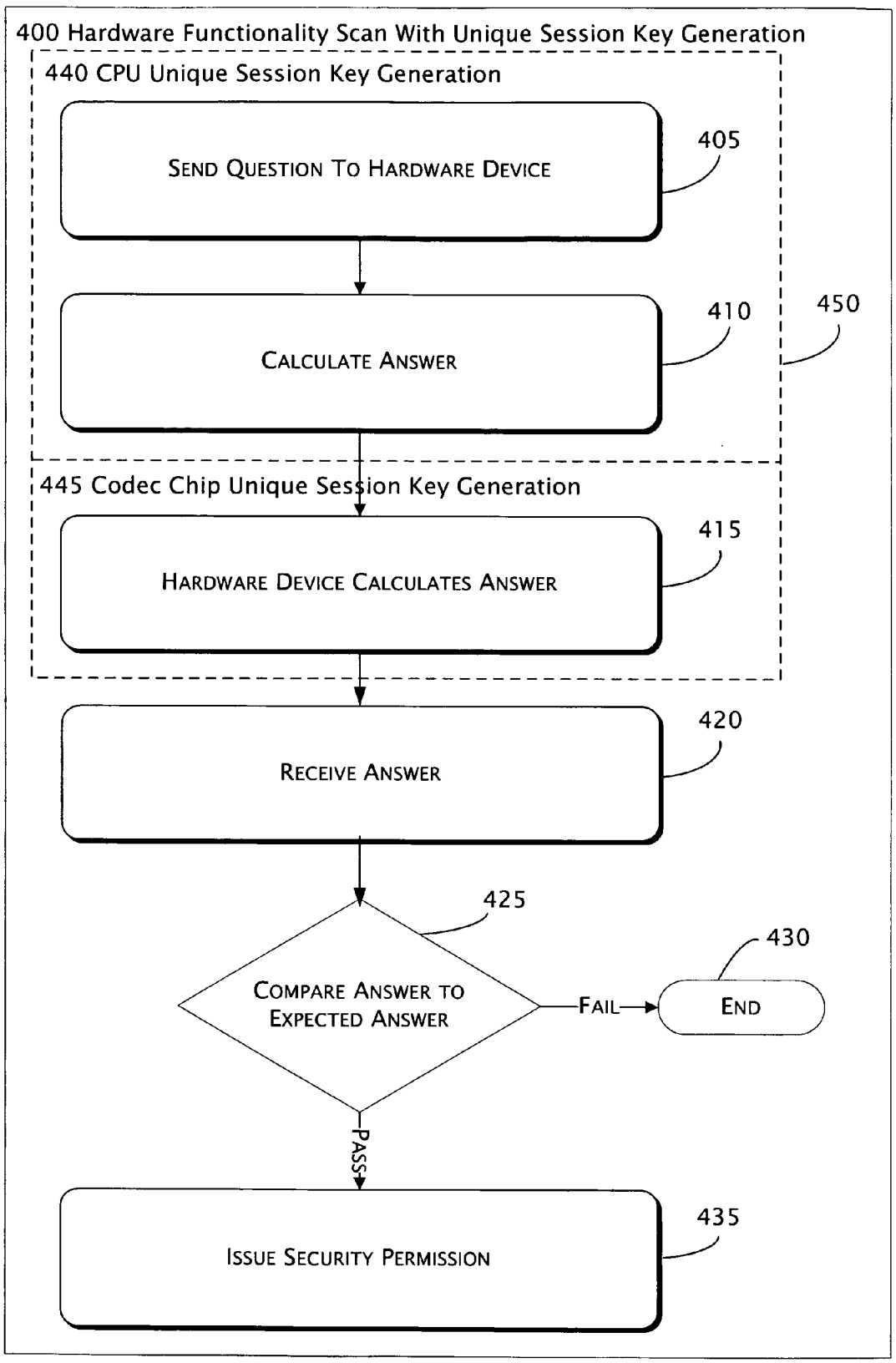
FIG. 4 is a flow diagram showing an exemplary process for performing a hardware functionality scan including unique session key generation implemented by the computer processor board of a CPU.

FIG. 4 is a flow diagram showing an exemplary process for performing a hardware functionality scan including unique session key generation that may be implemented by the computer processor board of a CPU. The sequence 400 is typically executed on a CPU 320 (of FIG. 3), but may be executed on any processor.

The exemplary process for performing a hardware functionality scan 400 may include a process for generating a unique session key by a CPU and a codec chip 450 in addition to the hardware functionality scan. Block 450, which may include blocks 440 and 445, shows a minimum number of operations that may be used to implement a hardware functionality scan. Other operations may be added in alternative examples to provide unique session key generation and will be further described in the following figures. Note that not all operations performed by the CPU and the codec chip in the process for generating a unique session by a CPU and a codec chip 450 may be performed in the process for performing a hardware functionality scan 400. Any combination of the operations performed in the process for generating a unique session by a CPU and a codec chip 450 may be performed in the process for performing a hardware functionality scan 400.

A hardware functionality scan may include unique session key generation to provide a renewable unique session key. Such an addition may tend to increase the security of the system. Such a renewable unique session key process may be implemented by process in the CPU and the codec chip.

The CPU unique session key generation process 440 may be a subset of the exemplary process for performing a hardware functionality scan 400. The CPU unique session key generation process 440 will be discussed more fully in the detailed discussion for FIG. 5.

At block 405, the CPU typically selects and sends a query to the graphics device or codec device in order to verify the authenticity of the graphics device or codec device. As discussed earlier, the query may be constructed in such a way that agreed upon random values are used, and that only the real graphics device or codec device may be capable of providing an answer or response that verifies the graphics device.

At block 410 the CPU calculates the expected result of the query. For example, the CPU may look up the expected result from a stored table corresponding to a table of queries from which the query at block 410 was chosen. In another example, the CPU performs the query using a software emulation of the hardware of the graphics device or audio codec device.

Note that not all operations performed in the CPU unique session key generation process 440 may be performed at this point of the hardware functionality scan process 400. Any combination of the operations performed in the CPU unique session key generation process 440 may be performed at the point of the hardware functionality scan process 400.

The codec chip unique session key generation process 445, which may refer to the process the graphics chip or codec chip performs to generate a unique session key, is also a subset of the exemplary process for performing a hardware functionality scan 400. The codec chip unique session key generation process 445 will be discussed more fully in the detailed description for FIG. 6.

At block 415 the graphics device or audio codec device receives the query, then performs the query, then stores the result. The graphics chip or codec chip would then typically send the result back to the CPU for evaluation.

Note that not all operations performed in the codec chip unique session key generation process 445 may be performed at this point of the hardware functionality scan process 400. Any combination of the operations performed in the codec chip unique session key generation process 445 may be performed at the point of the hardware functionality scan process 400.

Next at block 420, the CPU typically receives the results of the query from the graphics chip or audio codec chip. Note the CPU may not need to receive the results of the query to determine if the graphics device is real. A zero-knowledge-proof may be used with the graphics chip or codec chip for the graphics chip or codec chip to prove the graphics chip or codec has calculated the correct result to the query. For example, the graphics chip or codec chip and the CPU may use the result of the query as a key to a follow-on message to the graphics chip or codec chip, and the graphics chip or codec chip may only continue to function if the graphics chip or codec chip produced the expected result to the query, as the graphics chip or codec chip may not have been able to receive the follow-on message which may have allowed the graphics chip or codec chip to continue functioning.

Block 425 may represent an operation to compare the answer received from the graphics chip or codec chip at block 420 with the answer calculated by the CPU at block 410. Such a comparison may take any form, and the type or design of the comparison operation is not limited in any way. The CPU may then analyze the results of the comparison and determine whether the comparison passed or failed. If the comparison failed the verification may typically end at block 430.

Terminating the process at block 430 may be the result of the CPU determining the result returned from the graphics chip or codec chip was different from the expected result which may indicate that either an unauthorized graphics chip or codec chip or a hacker is present. The flow of execution typically ends at this point because a security permission may not be issued to the graphics chip or codec chip because the graphics chip or codec chip may not have been validated.

Continuing the process at block 435 may be the result of the CPU determining the result returned from the graphics chip or codec chip was acceptable when compared to the expected result. The secure system may conclude that the graphics chip or codec chip has passed the hardware functionality scan and is an authentic graphics chip or codec chip and not a hacker with an emulation device. The CPU may then issue a security permission on behalf of the graphics chip or codec chip, the security permission indicating that the graphics device has been validated.

Figure 5:
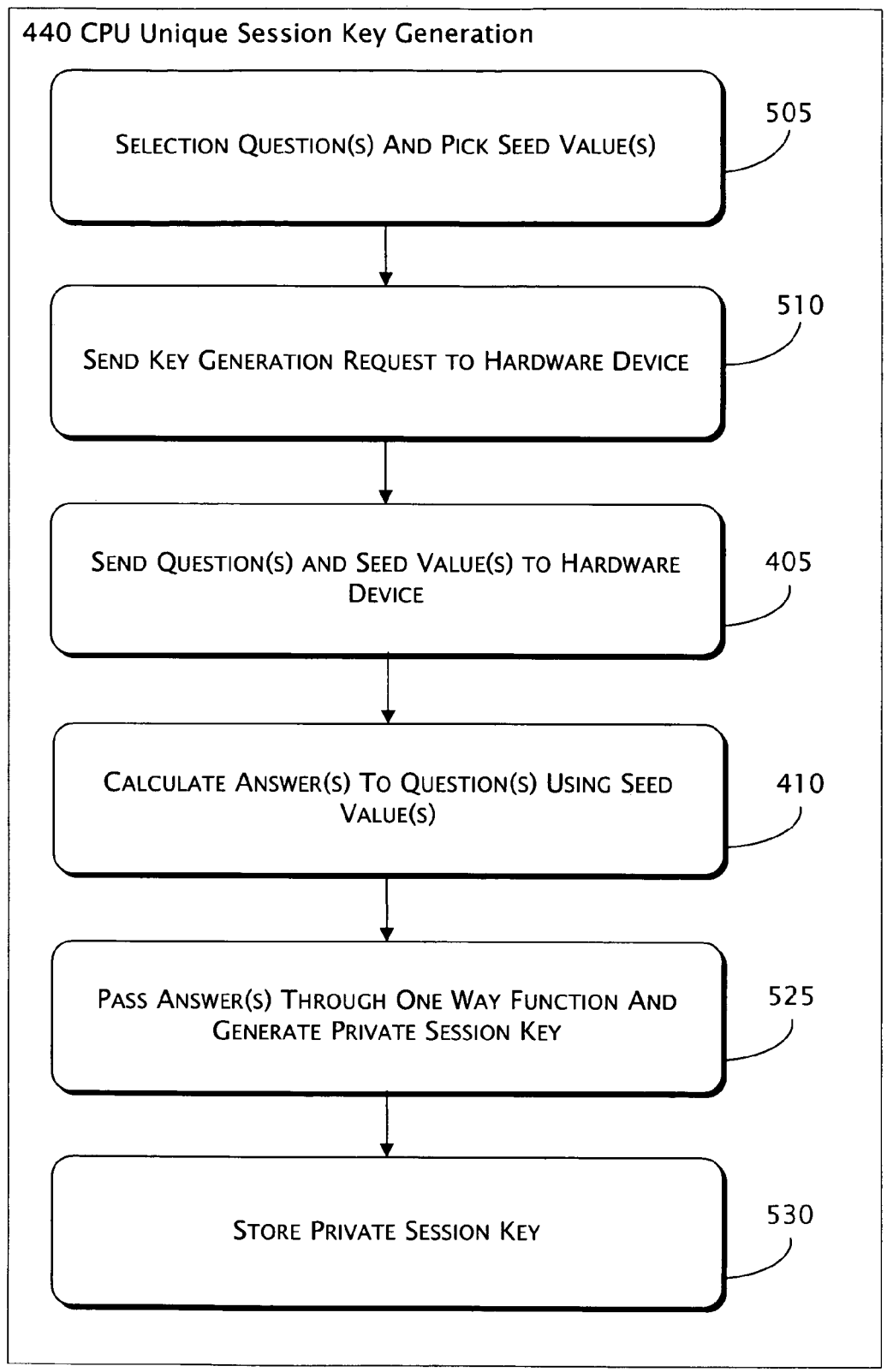
FIG. 5 is a flow diagram of a CPU generating a unique session key and also sending a request to a hardware device requesting that the hardware device generate a unique session key.

FIG. 5 is a flow diagram of a process for a CPU generation of a unique session key. As previously described, a renewable unique session key may utilize a processor and graphics chip or codec chip to provide the process. At block 505, the CPU may select a query and a seed value, or modifier, for the query. The CPU may select the query at random, according to a set schedule, or using any method. The seed value may also be selected at random, according to set schedule, or using any method. Note that the query may be comprised of multiple queries and multiple seed values and the CPU is not limited in the manner which the CPU may choose the query or queries and the seed value or values.

Continuing to block 510, the CPU may send an indication to the hardware device which the CPU wishes to generate a unique session key indicating that the hardware device should begin the process of generating a unique session key. Block 405 and 410 function as previously described to provide a hardware functionality scan.

At block 525, the CPU may implement a one-way function and pass the answer or answers to the query or queries as a parameter or parameters to the one-way function and the result of invoking the one-way function may be a unique session key.

Finally, at block 530, the CPU may store the unique session key for use in any operation that will require the use of a unique session key, for example, in the creation of a secret encryption key. Once the CPU unique session key generation is complete, the codec chip unique session key may be generated. In an alternative embodiment, the codec chip unique session key may be generated before the CPU unique session key is generated.

Figure 6:
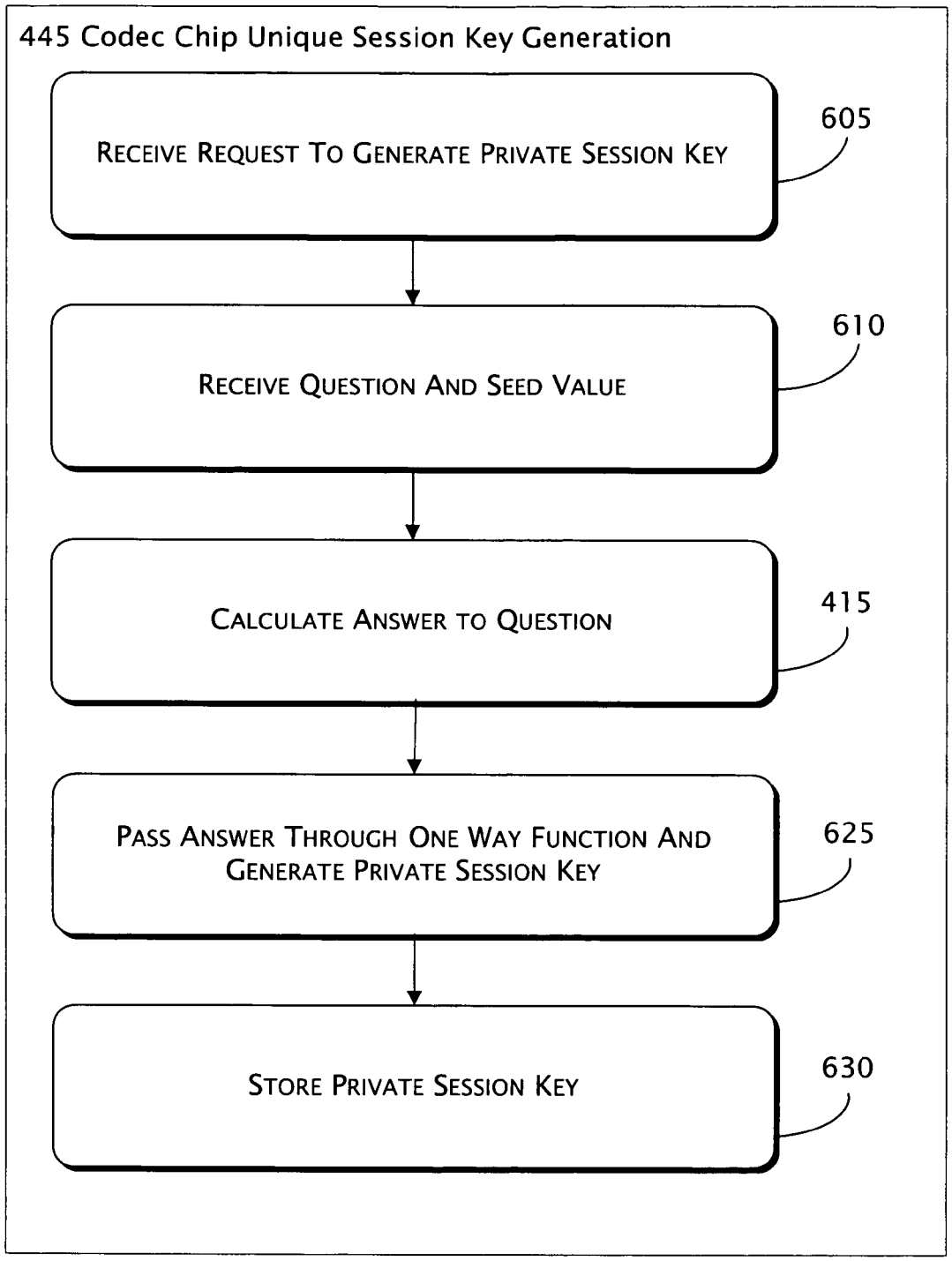
FIG. 6 is a flow diagram showing a response of a hardware device responding to a request to generate a unique session key.

FIG. 6 is a flow diagram showing a response of a hardware device, such as an audio codec chip, responding to a request to generate a unique session key. The process shown in this flow diagram augments the previously described hardware functionality scan process. This is accomplished by adding process 605, 610, 625, and 630 which allow renewable unique session keys to be generated by the codec chip.

At block 605, the hardware device, or codec chip, may receive a request from the CPU to generate a unique session key. Block 605 may be performed in response to the operation performed by the CPU at block 510 (of FIG. 5). At block 605, the hardware device or codec chip may discard any earlier created unique session keys or may not have created a secret session key at this point.

At block 610, the hardware device or audio codec chip may receive a question or questions and a seed value or values. Block 610 may be performed in response to the operation performed by the CPU at block 405 (of FIG. 5). Block 415 functions as previously described to provide a hardware functionality scan.

Continuing to block 625, the hardware device or codec chip may implement a one-way function and then pass the answer or answers to the query or queries through such one-way function to generate a unique session key.

Finally at block 630, the hardware device or codec chip may store the unique session key generated at block 625 and use the private session for any operation which may require the use of the unique session key, for example, the creation of a secret encryption key. As previously described, the blocks may be implemented in various combinations to provide processes that implement a hardware functionality scan with a unique session key generation, a hardware functionality scan, or a unique session key generation.

Figure 7:
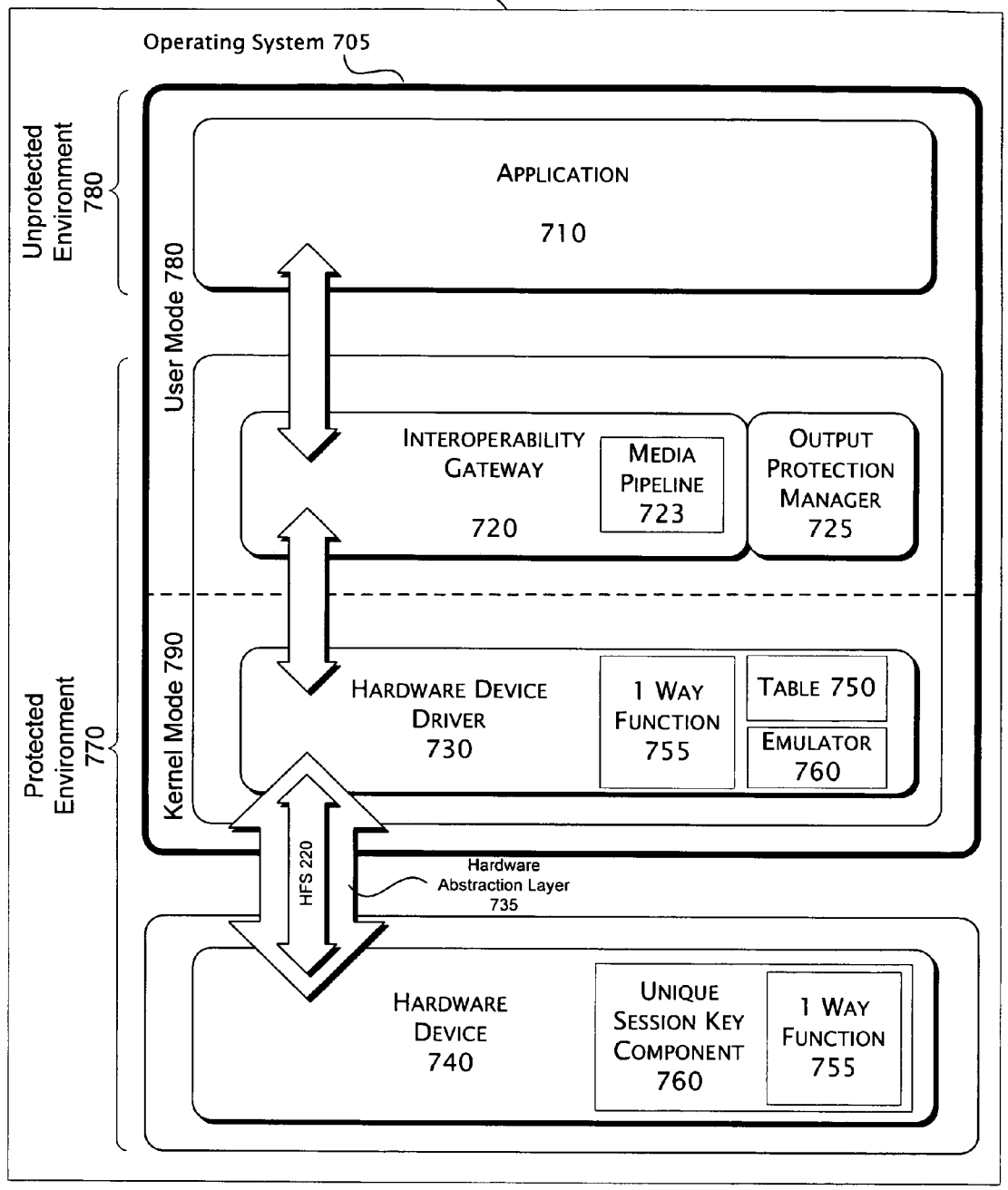
FIG. 7 is a block diagram showing an exemplary computer operating system in which a hardware functionality scan system and/or a unique session key system may be implemented.

FIG. 7 is a block diagram showing an exemplary computer operating system in which a hardware functionality scan system and/or a unique session key system may be implemented. Such an environment may allow a hardware functionality scan or a unique session key to be generated by a trusted source.

A PC with a hardware functionality scan system 210 (from FIG. 2) may typically execute in an operating system 705 to run an application 710. The application 710 may typically be coupled to an interoperability gateway 720. The interoperability gateway 720 may be typically coupled to an audio or graphics hardware driver 730, and in addition, the interoperability gateway 720 may have a secure coupling to the audio or graphics hardware driver 730. The audio or graphics hardware driver 730 may be typically coupled to a hardware abstraction layer 735, and the hardware abstraction layer 735 may be coupled to the audio or graphics hardware device 740.

The operating system 705 may implement a user mode 780 and a kernel mode 790. The application 710 may typically execute in user mode 780, and the interoperability gateway 720 also may typically execute in user mode 780. The hardware driver 730 may typically execute in kernel mode 790. The operating system 705 may typically implement user mode 780 and kernel mode 790 for security reasons. The operating system 705 may provide user mode 780 with less security permissions than the operating system 705 may provide to kernel mode 790 because kernel mode 790 may have access to elements of the PC 210 which may be more vulnerable to access by hackers. The operating system 705 may not allow components which are not digitally signed and trust to be executed in kernel mode 790. The operating system 705 may typically provide user mode 780 with less security permissions, and correspondingly less access to the elements of the PC 210 which may be more vulnerable to hackers. The operating system 705 may also typically execute user mode 780 and kernel mode 790 concurrently, and may further execute more than one instance of user mode 780 at once. Security of the kernel mode 790 and user mode 780 may be augmented by providing a protected environment 770.

That is, the operating system 705 may typically implement an additional layer of security by including differing levels of security execution environments, for example a protected environment 770. An example of a protected environment is provided in U.S. patent application Ser. No. 11/116,598, filed Apr. 27, 2005 which is hereby incorporated by reference in its entirety.

The operating system 705 may include an unprotected execution environment 780 in addition to the protected execution environment 770, with the unprotected execution environment 780 including less security permissions than the protected execution environment 770. The operating system 705 may typically impose a set of security requirements before the operating system 705 which may allow an interoperability gateway 720 or an audio or graphics hardware driver 730 to be either loaded or executed in the protected execution environment 770. For example, a security requirement may be some form of digital signing or other digital proof of trust. In this manner, the operating system 705 may trust the interoperability gateway 720 or the audio or graphics hardware driver 730 and grant the interoperability gateway 720 or the hardware driver 730 more access to the resources of the PC 210 which the operating system 705 controls. In addition, the operating system 705 may typically implement a smaller set of security requirements before it may allow the application 710 to be loaded or executed, but the operating system 705 may grant the application 710 less access to the resources of the PC 210 which the operating system 705 controls.

Since the audio or graphics hardware driver 730 may execute both in kernel mode 790 and in a protected execution environment 770, this level of security may be satisfactory to a content provider to authenticate the audio or graphics hardware device 740. Further, kernel mode 790 may require that the audio or graphics hardware driver 730 be digitally signed and trusted before it may be loaded and executed in kernel mode 790 to offer proof that the audio or graphics hardware driver 730 has been received from a legitimate source. Such proof may be of use in a system of digital rights management ("DRM").

Further, the operating system 705 may implement digital rights management. The content provider trusts DRM and the content provider in turn may require that DRM implements the policy given to DRM for the content. DRM may then verify the content is used with a digitally signed component and if requested that the audio or graphics driver 730 has undergone a hardware functionality scan 220. The content provider may be satisfied that the audio or graphics hardware driver 730 has authenticated the hardware 740 on behalf of the content provider 110, and therefore the content provider 110 may be satisfied a hacker has not replaced the real audio or graphics hardware device 740 with an emulation of the audio or graphics hardware device 740 typically to copy the content of the content provider at this vulnerable point. Authentication and content encryption in a DRM system may be augmented by a hardware functionality scan 220 and unique session keys as previously described.

Hardware Functionality Scan

While a real audio or graphics hardware device 740, for example audio or graphics hardware 740, may offer protection from copying by implementing security elements which prevent unauthorized copying, a hacker or other unauthorized third party may create an emulation of the audio or graphics hardware device 740 and insert it in the PC 210. Such a counterfeit hardware device may appear to be the real audio or graphics hardware device 740, however, a hacker or other unauthorized third party may have constructed the emulated hardware device to report that security features are enabled when the security features are not enabled. In so doing, the audio or graphics device driver 730 may provide a vulnerable version of the information from the content provider 110 to the counterfeit hardware device, and the counterfeit hardware device may freely copy the information.

Accordingly, the operating system 705 may verify that the audio or graphics hardware device 740 is real by using a signed and trusted audio or graphics driver 730, and requesting the audio or graphics hardware driver 730 perform a hardware functionality scan 220 using the hardware abstraction layer 735. The hardware functionality scan 220 may determine whether or not the audio or graphics hardware device 740 is a real hardware device and not an emulation put in place by a hacker. Furthermore, to ensure the integrity of Kernel Mode 790 the operating system 705 may verify that all components loaded into to kernel mode and signed and trusted.

The hardware functionality scan 220 is typically a query sent by the audio or graphics hardware driver 730 to the audio or graphics hardware 740. The query may be written to test the unique complex hardware structure of the audio or graphics hardware device 740. The audio or graphics hardware device 740 may be a complex device and it may be difficult for an emulation of the audio or graphics hardware device 740 put in place by a hacker to access the protected content to duplicate or produce the correct response. That is, the queries constructed by the audio or graphics hardware driver 730 when performing the hardware functionality scan 220 may be constructed in such a way that the answers to the queries typically uniquely identify the hardware device 740.

Further, the audio or graphics hardware driver 730 may store a table 750 of queries that it sends to the audio or graphics hardware device 740. These queries may accept random input data, and the audio or graphics hardware driver 730 may in turn select the input for the query at random. The hardware driver 730 may then compare the answer returned by the audio or graphics hardware 740 to an answer which it expects. Such a comparison may be done directly by requesting the answer from audio or graphics hardware 740 or alternatively may be done indirectly by using the answer in further operations which will only succeed if the audio or graphics hardware 740 has generated the proper answer. If the audio or graphics hardware driver 730 determines the answers are equal, the audio or graphics hardware driver 730 may further determine the audio or graphics hardware device 740 is verified and authentic.

In another example, the audio or graphics hardware driver 730 may implement an emulator 760 of any portion of the audio or graphics hardware 740. The emulator 760 may be an emulation of the audio or graphics hardware 740 such that the hardware driver 730 may choose a value and perform an operation using the emulator 760, and then may pass the same value and request to the audio or graphics hardware 740 so the audio or graphics hardware 740 may perform the same operation with the same value. The audio or graphics hardware driver 730 may then verify the results of the operation as performed by the emulator 750 and the audio or graphics hardware 740 to determine the audio or graphics hardware 740 is verified and authentic.

Once the audio or graphics hardware driver 730 has performed the hardware functionality scan 220 and determined the real audio or graphics hardware device 740 is in place, the audio or graphics hardware driver 730 may have performed the function of authenticating and verifying the audio or graphics hardware device 740 and satisfied the trust agreed upon with the content provider as discussed earlier.

Establishing a Unique Session Key

The hardware device driver 730, which may be an audio or graphics device driver or may be any other complex integrated circuit chip, may encrypt whatever audio and/or visual or data content is sent to the hardware device 740, which may be an audio or graphics hardware device, in order to further protect the audio and/or visual content from being intercepted and copied by a hacker. The hardware device driver 730 may securely obtain a private encryption key or may make use of an existing private encryption key to encode the audio and/or visual content to be sent to the audio or graphics hardware device for decryption or playback.

However, in order to decrypt the encrypted audio and/or visual content, the hardware device 740 may require the private encryption key be stored within the hardware device 740 in advance at the time of manufacturing. Should this private encryption key become compromised or discovered by a hacker after manufacturing, the key may no longer be useful for encrypting or decrypting the audio and/or visual content as anyone who has discovered the private encryption key may decrypt the audio and/or visual content and use the decrypted audio and/or visual content in any manner they wish.

The current system may not require a private key be included in the hardware device 740 by making use of the unique and complex information which may be generated independently by the hardware device driver 730 and the hardware 740 when a subset of the functionality of a hardware functionality scan 220 is performed. Each of the hardware device driver 730 and the hardware device 740 may utilize the unique and complex information created during the query and answer portion of a hardware functionality scan to produce a unique session key. For example, the hardware device 740 may include a unique session key component 760 which may in turn include a one-way function 755 which corresponds to the one-way function 755 included in the hardware device driver 730. The unique session key component 760 may send the results of the hardware functionality scan query to the one-way function 755 instead of sending the results of the query back to the device driver 730.

In order to generate a corresponding unique session key, the hardware device driver 730 may have produced an identical set of complex and unique information in calculating the result of the query. The hardware device driver 730 may also send the results of the query to the one-way function 755 and generate a unique session key. Because each of the hardware device driver 730 and the hardware device 740 have generated a unique session key independently and without exchanging the unique session key, they may now each generate any number of unique keys at any point in time which may not be susceptible to interception by a hacker as the unique session keys may not need to be transmitted.

The unique session key generated independently at the hardware device driver 730 and the hardware device 740 may then be used to further create any number of private encryption keys which may then be used to encrypt audio and/or visual content, or any other type of binary content, at the hardware device driver 730 which may then be decrypted by the hardware device 740.

If such a private encryption key should be discovered by a hacker, both the hardware device driver 730 and the hardware device 740 may discard the existing unique session key and repeat the process to generate a new unique session key and further use the newly generated unique session key to create a new private encryption key at both the hardware device driver 730 and the hardware device 740. Such a new private encryption key would not be known by a hacker and content passed from the hardware device driver 730 to the hardware device 740 may be encrypted and protected by the new private encryption key.

Additionally, if the details of the specific hardware functions inside the hardware device 740 should be discovered by a hacker, hardware device driver 730 may be updated and/or enhanced with a new set of queries. The hardware device driver 730 may then be revoked and may be renewed such that the new queries which may be unknown to a hacker may be used to generate a new unique session key.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. One or more computer storage devices having instructions stored thereon that, when executed by a computing device, cause the computing device to perform acts comprising:
in a first instance:
sending a query to a hardware device, the hardware device being one of a plurality of devices associated with a manufacturing model having a common processing signature;
determining an expected result of the query, the expected result reflecting the common processing signature associated with the manufacturing model of the hardware device;
creating, on a processing unit of the computing device, a first session key based on the expected result of the query; and
using the first session key to encrypt or decrypt at least one communication with the hardware device,
wherein the hardware device creates a second session key based on the query by passing an actual result of the query through a function to create the second session key, the second session key being usable to encrypt or decrypt the at least one communication, and
wherein creating the first session key includes passing the expected result of the query through the function used by the hardware device to create the second session key; and
in a second instance:
performing the sending, the determining, and the creating again with a different query to obtain a different expected result and a different session key, and
using the different session key to encrypt or decrypt at least one other communication with the hardware device.

2. The one or more computer storage devices of claim 1, wherein the expected result and the different expected result are stored in a table.

3. The one or more computer storage devices of claim 2, wherein the query and the different query are chosen at random from the table.

4. The one or more computer storage devices of claim 2, wherein the table is obfuscated.

5. The one or more computer storage devices of claim 1, wherein the expected result and the different expected result are generated using software emulation of the hardware device.

6. The one or more computer storage devices of claim 5, the acts further comprising:
passing a seed to the software emulation of the hardware device to obtain the expected result, and
passing a different seed to the software emulation of the hardware device to obtain the different expected result.

7. The one or more computer storage devices of claim 5, wherein the software emulation of the hardware device is obfuscated.

8. The one or more computer storage devices of claim 1, the acts further comprising performing the sending, the determining, the creating, and the using each time the hardware device is started.

9. The one or more computer storage devices of claim 1, wherein the second instance occurs when the first session key becomes publicly known.

10. The one or more computer storage devices of claim 1, wherein the function is a one way function.

11. The one or more computer storage devices of claim 10, wherein the one way function is a cryptographic hash function.

12. A system, comprising:
a processing unit;
a hardware device configured to perform graphical rendering or audio decoding of data, wherein the graphical rendering or the audio decoding comprises characteristics particular to the hardware device; and
a hardware device driver configured to execute on the processing unit to provide access to the hardware device, the hardware device being coupled to the processing unit via a bus, the hardware device driver further configured to:
provide a query to the hardware device;
determine an expected result of the query, the expected result having characteristics that are expected to be consistent with the characteristics particular to the hardware device; and
execute a first one way function to generate a first session key based on the expected result of the query;
the hardware device being further configured to:
receive the query;
generate an actual result of the query, the actual result having the characteristics particular to the hardware device; and
pass the actual result to a second one way function to generate a second session key,
wherein the first session key and the second session key are usable together to encrypt or decrypt the data, provided the characteristics of the expected result determined by the hardware device driver are consistent with the characteristics of the actual result generated by the hardware device.

13. The system of claim 12, the hardware device comprising non-volatile storage configured to store the second session key.

14. The system of claim 12, wherein the hardware device driver executes in a trusted location.

15. The system of claim 12, further comprising instructions that, when executed by the processing unit, configure the processing unit to revoke and renew the hardware device driver in an instance when the query becomes publicly known.

16. The system of claim 12, wherein the one way function and the second one way function comprise the same one way function.

17. The system of claim 12, wherein the first session key and the second session key are identical.

18. The system of claim 12, further comprising instructions that, when executed by the processing unit, configure the processing unit to:
create additional private encryption keys based on the first session key and the second session key; and
use the additional private encryption keys to directly encrypt or decrypt the data.

19. A method comprising:
sending a query to a hardware device, the hardware device being configured to perform processing for digital to analog conversion of data, the processing having characteristics particular to the hardware device;
identifying a known result of the query, the known result being consistent with the processing characteristics particular to the hardware device;
creating a first session key based on the known result of the query; and
using the first session key to encrypt or decrypt at least one communication with the hardware device,
wherein the hardware device creates a second session key based on the query by passing the second session key through a one-way function to obtain the second session key, the second session key being usable to encrypt or decrypt the at least one communication, and
wherein creating the first session key includes passing the known result of the query through the one-way function used by the hardware device to create the second session key.

20. The method according to claim 19, wherein the hardware device is a graphics device and the processing comprises graphics processing, or the hardware device is an audio codec chip and the processing comprises audio processing.

\* \* \* \* \*